(12) United States Patent
Gilsdorf et al.

(10) Patent No.: US 10,846,014 B2
(45) Date of Patent: Nov. 24, 2020

(54) CONCEPT FOR GROUP MEMORY WRITE INSTRUCTIONS

(71) Applicant: Intel Corporation, Santa Clara, CA (US)

(72) Inventors: Ginger Gilsdorf, Chandler, AZ (US); Karthik Kumar, Chandler, AZ (US); Thomas Willhalm, Sandhausen (DE); Mark Schmisseur, Phoenix, AZ (US); Francesc Guim Bernat, Barcelona (ES)

(73) Assignee: Intel Corporation, Santa Clara, CA (US)

(*) Notice: Subject to any disclaimer, the term of this patent is extended or adjusted under 35 U.S.C. 154(b) by 14 days.

(21) Appl. No.: 16/221,743

(22) Filed: Dec. 17, 2018

(65) Prior Publication Data
US 2019/0227737 A1 Jul. 25, 2019

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0631* (2013.01); *G06F 12/02* (2013.01)

(58) Field of Classification Search
CPC .... G06F 3/0655; G06F 3/0604; G06F 3/0631; G06F 12/02
USPC ...................................... 711/154
See application file for complete search history.

(56) References Cited

U.S. PATENT DOCUMENTS

| | | | | |
|---|---|---|---|---|
| 2013/0290777 | A1* | 10/2013 | Yoshihara | G06F 11/108 714/15 |
| 2016/0255150 | A1* | 9/2016 | Dhuse | G06F 3/067 709/213 |
| 2016/0342351 | A1* | 11/2016 | Li | G06F 11/1471 |
| 2019/0035473 | A1* | 1/2019 | Rajamani | G06F 3/061 |

* cited by examiner

*Primary Examiner* — Than Nguyen
(74) *Attorney, Agent, or Firm* — 2SPL Patent Attorneys PartG mbB; Kieran O'Leary

(57) ABSTRACT

Examples relate to a method for a memory module, a method for a memory controller, a method for a processor, to a memory module controller device or apparatus, to a memory controller device or apparatus, to a processor device or apparatus, a memory module, a memory controller, a processor, a computer system and a computer program. The method for the memory module comprises obtaining one or more memory write instructions of a group memory write instruction. The group memory write instruction comprises a plurality of memory write instructions to be executed atomically. The one or more memory write instructions relate to one or more memory addresses associated with memory of the memory module. The method comprises executing the one or more memory write instructions using previously unallocated memory of the memory module. The method comprises obtaining a commit instruction for the group memory write instruction. The method comprises updating the one or more memory addresses based on the previously unallocated memory used for executing the one or more memory write instructions after obtaining the commit instruction for the group memory write instruction.

19 Claims, 16 Drawing Sheets

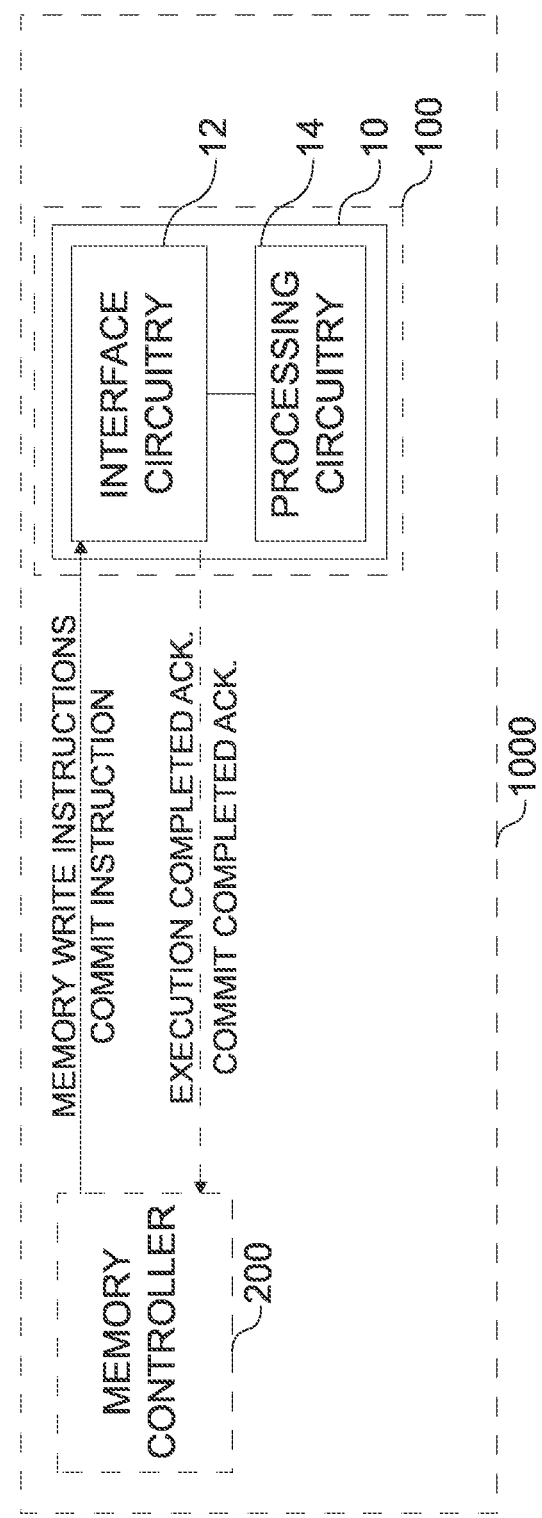

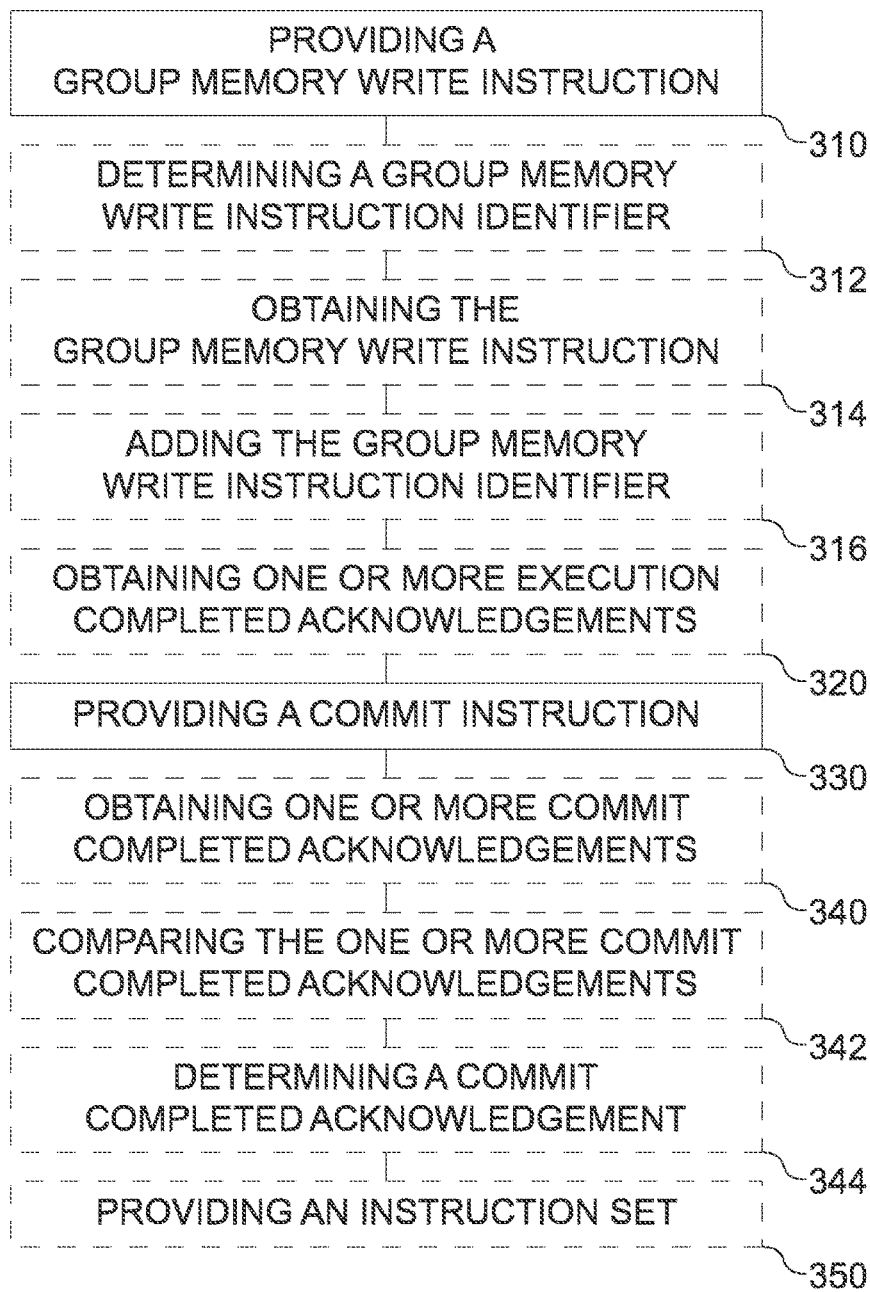

3DXP Media Addresses

0x4FA3 | "Tempe"

0xCC42 | "85251"

434a
434b

AIT Table

| Phy. Addr. | Media Addr. | Group ID |
|---|---|---|
| 0x3104 | 0x4FA3 | 01 |
| 0x313C | 0xA3A8 | 00 |
| 0x31F9 | 0xCC42 | |
| 0x3108 | 0x538B | |
| 0x31ED | 0x76A2 | 00 |
| ... | ... | |

| Group ID | Media Addr. | Shadow Addr. |
|---|---|---|
| 00 | 0xA3A8 | 0x060C |
| 00 | 0x76A2 | 0x048E |
| 01 | 0x4FA3 | 0x121F |

Fig. 4b

3DXP Media Addresses

| | |
|---|---|
| 0x4FA3 | "Tempe" |

| | |
|---|---|
| 0xCC42 | "85251" |

434c

| | |
|---|---|
| 0x121F | "Chandler" |

434a

434b

AIT Table

| Phy. Addr. | Media Addr. | Group ID |
|---|---|---|
| 0x3104 | 0x4FA3 | 01 |
| 0x313C | 0xA3A8 | 00 |
| 0x31F9 | 0xCC42 | |
| 0x3108 | 0x538B | |
| 0x31ED | 0x76A2 | 00 |
| ... | ... | |

| Group ID | Media Addr. | Shadow Addr. |
|---|---|---|
| 00 | 0xA3A8 | 0x060C |
| 00 | 0x76A2 | 0x048E |
| 01 | 0x4FA3 | 0x121F |

Fig. 4c

AIT Table

| Phy. Addr. | Media Addr. | Group ID |
|---|---|---|
| 0x3104 | 0x4FA3 | 01 |
| 0x313C | 0xA3A8 | 00 |
| 0x31F9 | 0xCC42 | 01 |
| 0x3108 | 0x538B | |
| 0x31ED | 0x76A2 | 00 |
| ... | ... | |

| Group ID | Media Addr. | Shadow Addr. |
|---|---|---|
| 00 | 0xA3A8 | 0x060C |
| 00 | 0x76A2 | 0x048E |
| 01 | 0x4FA3 | 0x121F |
| 01 | 0xCC42 | 0x7431 |

3DXP Media Addresses

0x4FA3 | "Tempe"  — 436a

0xCC42 | "85251"

0x121F | "Chandler" — 436b

3DXP Media Addresses

| | |
|---|---|
| 0x4FA3 | "Tempe" |

| | |
|---|---|
| 0xCC42 | "85251" |

| | |
|---|---|
| 0x121F | "Chandler" |

| | |
|---|---|
| 0x7431 | "85226" |

434d
436d

AIT Table

| Phy. Addr. | Media Addr. | Group ID |
|---|---|---|
| 0x3104 | 0x121F | 01 |
| 0x313C | 0xA3A8 | 00 |
| 0x31F9 | 0x7431 | 01 |
| 0x3108 | 0x538B | |
| 0x31ED | 0x76A2 | 00 |
| ... | ... | ... |

| Group ID | Media Addr. | Shadow Addr. |
|---|---|---|
| 00 | 0xA3A8 | 0x060C |
| 00 | 0x76A2 | 0x048E |
| 01 | 0x4FA3 | 0x121F |
| 01 | 0xCC42 | 0x7431 |

Fig. 4e

3DXP Media Addresses

| | |
|---|---|
| 0x4FA3 | <free for use> 438 |

| | |
|---|---|
| 0xCC42 | <free for use> 440 |

| | |
|---|---|
| 0x121F | "Chandler" |

| | |
|---|---|
| 0x7431 | "85226" |

AIT Table

| Phy. Addr. | Media Addr. | Group ID |
|---|---|---|
| 0x3104 | 0x121F | |
| 0x313C | 0xA3A8 | 00 |
| 0x31F9 | 0x7431 | |
| 0x3108 | 0x538B | |
| 0x31ED | 0x76A2 | 00 |
| ... | ... | ... |

| Group ID | Media Addr. | Shadow Addr. |
|---|---|---|
| 00 | 0xA3A8 | 0x060C |
| 00 | 0x76A2 | 0x048E |

CONCEPT FOR GROUP MEMORY WRITE INSTRUCTIONS

FIELD

Examples relate to a method for a memory module, to at method for a memory controller, to a method for a processor, to a memory module controller device or apparatus, to a memory controller device or apparatus, to a processor device or apparatus, to a memory module, to a memory controller, to a processor, to a computer system and to a computer program.

BACKGROUND

The storing of data in memory or storage is a field of research of development. One field of interest is the development of persistent memory, e.g. memory that may be used similar to volatile memory, but which persistently stores the data written to the persistent memory, such that the data is accessible after a power cycle of the computer system comprising the persistent memory.

BRIEF DESCRIPTION OF THE FIGURES

Some examples of apparatuses and/or methods will be described in the following by way of example only, and with reference to the accompanying figures, in which

FIG. 1d shows a block diagram of an example of a memory module controller apparatus or of a memory module controller device;

FIGS. 3a and 3b show flow charts of examples of a method for a processor;

FIGS. 4a to 4f show a sequence of how all-or-nothing transactions are implemented in hardware according to an example;

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
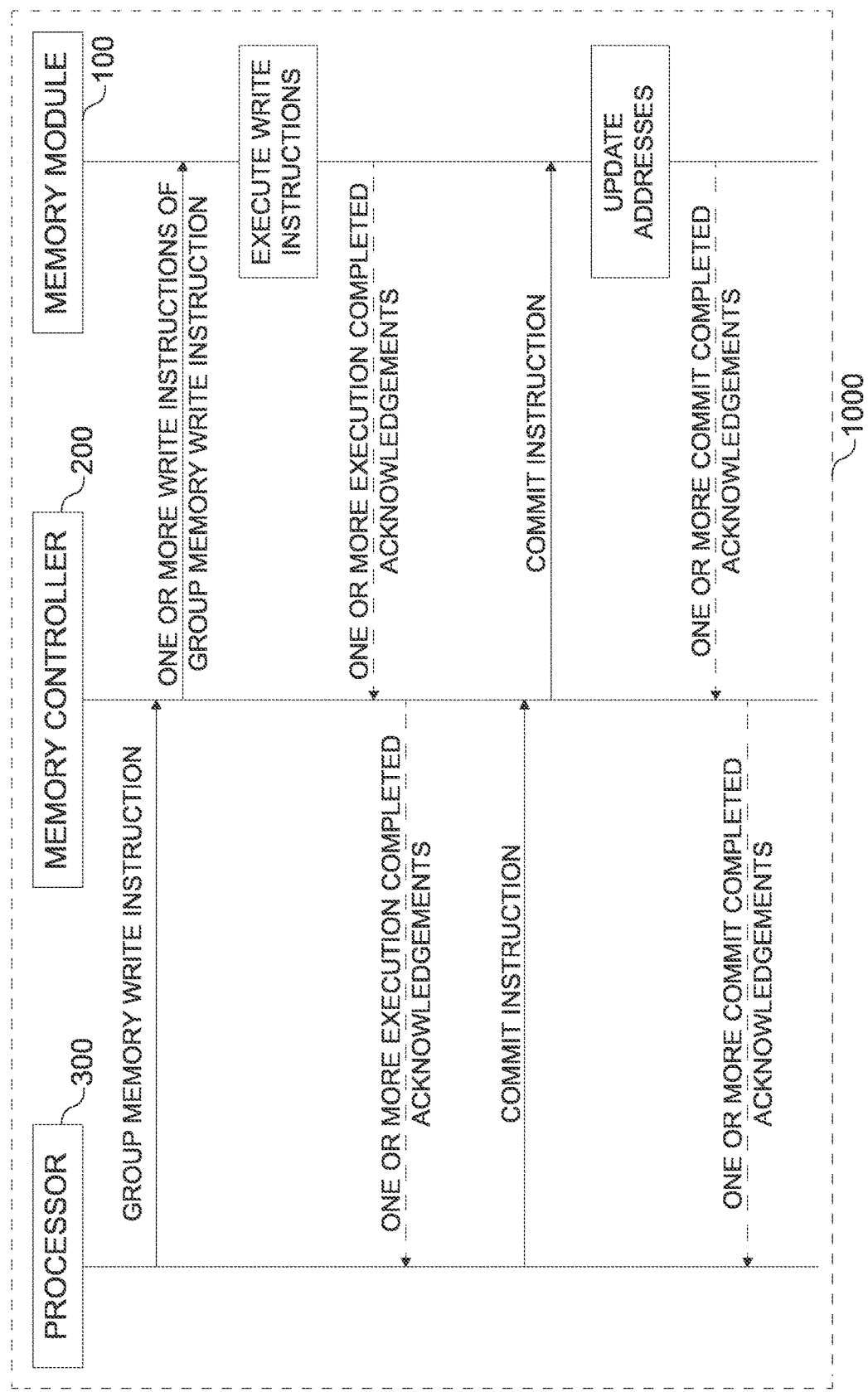
FIG. 1a shows a block diagram of an example of a computer system.

FIG. 1a shows a block diagram of an example of a computer system 1000. The computer system comprises one or more memory modules 100, one or more memory controllers 200 and a processor 300. The one or more memory modules 100, the one or more memory controllers 200 and/or the processor 300 may communicate via an interconnect, e.g. a memory bus of the computer system 1000. In at least some examples, the processor 300 provides a group memory write instruction to the one or more memory controllers 200 of the computer system 1000. The group memory write instruction comprises a plurality of memory write instructions to be executed atomically. The one or more memory controllers 200 may each obtain at least a portion of a group memory write instruction, which comprises one or more memory write instructions of the plurality of memory write instructions relating to one or more memory addresses of memory associated with the respective memory controller. The one or more memory controller may each forwarding the one or more memory write instructions to one or more memory modules 100 associated with the memory controller. The one or more memory modules 100 may each obtain one or more memory write instructions of the group memory write instruction. The one or more memory write instructions obtained by each memory module may relate to one or more memory addresses associated with memory of the respective memory module. The memory modules 100 may each execute the one or more memory write instructions using previously unallocated memory of the memory modules. Optionally, the memory modules 100 may provide one or more execution completed acknowledgements for the one or more memory write instructions executed by the respective memory module to memory controllers associated with the respective memory modules after executing the one or more memory write instructions, which may be forwarded by the memory controllers 200 to the processor 300. The processor 300 further provides a commit instruction for the group memory write instruction to the one or more memory controllers 200, which is forwarded by the memory controllers to the respective memory modules 100. The commit instruction is provided after the providing the group memory write instruction, e.g. not within the same instruction. The memory modules 100 update the respective one or more memory addresses based on the previously unallocated memory used for executing the one or more memory write instructions after obtaining the commit instruction for the group memory write instruction. After updating the one or more memory addresses, the one or more memory modules 100 may optionally provide commit completed acknowledgements to the memory controllers 200 associated with the respective memory modules, which may forward the commit completed acknowledgements to the processor 300.

In the following, the computer system 1000 is illustrated with a focus on the respective components. Methods, devices and apparatuses are introduced that may implement the scheme laid out in FIG. 1a.

Figure 1B:
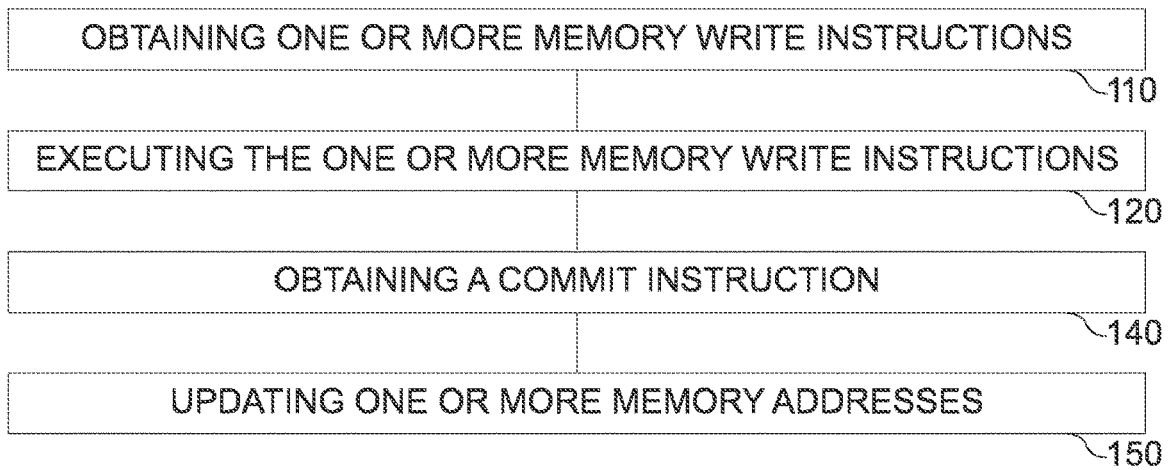
FIGS. 1b and 1c show flow charts of examples of a method for a memory module.
Figure 1C:
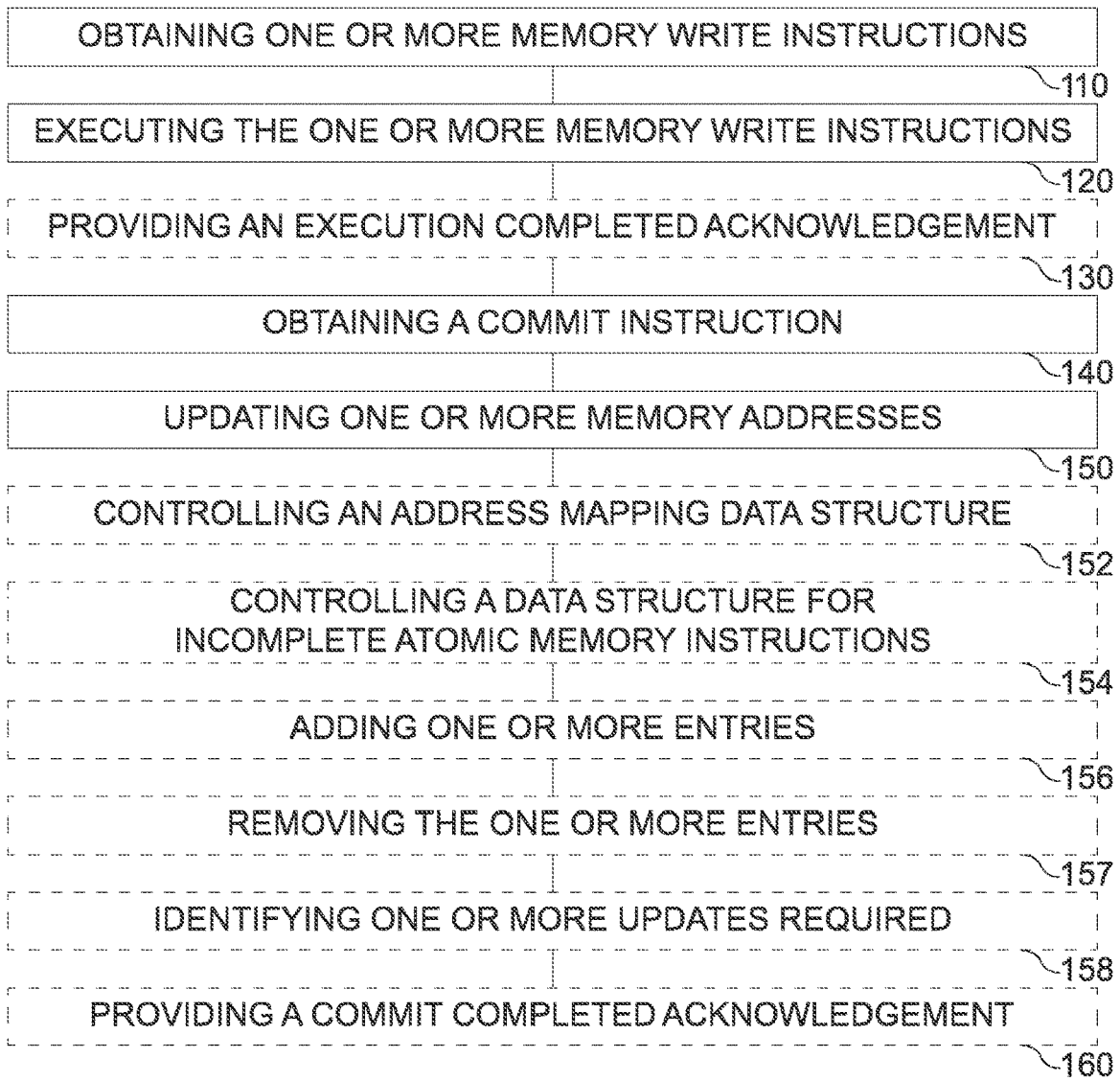

FIGS. 1b and 1c show flow charts of examples of a method for a memory module 100 of a computer system 1000, e.g. a memory module 100 of the one or more memory modules 100 and the computer system 1000 introduced in connection with FIG. 1a. The method comprises obtaining 110 one or more memory write instructions of a group memory write instruction. The group memory write instruction comprises a plurality of memory write instructions to be executed atomically. The one or more memory write instructions relate to one or more memory addresses associated with memory of the memory module. The method comprises executing 120 the one or more memory write instructions using previously unallocated memory of the memory module 100. The method further comprises obtaining 140 a commit instruction for the group memory write instruction. The method further comprises updating 150 the one or more memory addresses based on the previously unallocated memory used for executing the one or more memory write instructions after obtaining the commit instruction for the group memory write instruction. The method may be executed by the memory module 100.

FIG. 1d shows a block diagram of an example of a (corresponding) memory module controller apparatus 10 or of a memory module controller device 10 for the memory module 100 of the computer system. The described memory module controller apparatus 10 corresponds to the memory module controller device 10. The components of the memory module controller device 10 are defined as component means, which correspond to the respective structural components of the memory module controller apparatus 10. The memory module controller apparatus 10 comprises interface circuitry 12 (e.g. means for communicating 12 of the respective memory module controller device 10) configured to communicate with a memory controller 200 of the computer system 1000. The memory module controller apparatus 10 comprises processing circuitry 14 (e.g. means for processing 14 of the respective memory module controller device 10) configured to obtain one or more memory write instructions of a group memory write instruction (e.g. via the interface circuitry 12). The group memory write instruction comprises a plurality of memory write instructions to be executed atomically. The one or more memory write instructions relate to one or more memory addresses associated with memory of the memory module 100. The processing circuitry 14 is configured to execute the one or more memory write instructions using previously unallocated memory of the memory module 100. The processing circuitry 14 is configured to obtain a commit instruction for the group memory write instruction (e.g. via the interface circuitry 12). The processing circuitry 14 is configured to update the one or more memory addresses based on the previously unallocated memory used for executing the one or more memory write instructions after obtaining the commit instruction for the group memory write instruction. The processing circuitry 14 is coupled with the interface circuitry 12. FIG. 1d further shows the memory module 100 comprising the memory module controller apparatus or device 10, and the computer system 1000 comprising the memory module 100 with the memory module controller apparatus or device 10. In at least some examples the processing circuitry is configured to execute the method introduced in connection with FIGS. 1b and 1c.

The following description may relate to the computer system 1000, the memory module 100, the method for a memory module 100 and/or the memory module controller apparatus/device 10.

Executing the one or more instructions of the group memory write instruction using previously unallocated memory and committing the changes by updating the one or more memory addresses after receiving a commit instruction may enable an implementation of atomic write operations comprising a plurality of memory write instructions in persistent memory across more than one memory module, while tolerating a power cycle during the execution of the method.

The method comprises obtaining (e.g. receiving) 110 one or more memory write instructions of a group memory write instruction. For example, the group memory instruction may comprise an instruction indicating a beginning of the group memory write instruction and an instruction indicating a termination of the group memory write instruction. In at least some examples, the group memory write instruction further comprises a group memory write instruction identifier, e.g. an identifier for differentiating the group memory write instruction from one or more further group memory write instructions. The plurality of memory write instructions may be associated with the group memory write instruction identifier. For example, the group memory write instruction identifier may be a binary code for differentiating (different) group memory write instructions within the computer system 1000. Each instruction of the group memory write instruction may comprise the group memory write instruction identifier, e.g. to enable the memory controller or memory module to associate the instructions with the same group memory write instruction. In at least some examples, the one or more memory write instructions of the group memory write instructions are obtained/received from a memory controller 200 of the computer system 1000.

The group memory write instruction comprises a plurality of memory write instructions to be executed atomically. In at least some examples, (all) memory write instructions of the group memory write instruction, e.g. the plurality of memory write instructions, are to be executed atomically, e.g. in an all-or-nothing fashion. For example, the plurality of memory write instructions may either be successfully completed, or not completed at all. In at least some examples, the atomicity of the group memory write instruction may be achieved by first executing the write instructions on memory that is not previously allocated, e.g. memory used for wear leveling of a persistent memory device, and then (atomically) updating the memory addresses to point to the newly written data on the previously unallocated memory.

In at least some examples, the plurality of memory write instructions may relate to a plurality of memory addresses that are spread over more than one memory module, e.g. over one or more memory modules 100 associated with one or more memory controllers 200. For example, a first subset of the plurality of memory write instructions may relate to memory addresses associated with a first memory module, and a second, disjoint subset of the memory write instructions may relate to memory addresses associated with a second memory module. The one or more memory write instructions relate to one or more memory addresses associated with memory of the memory module. In at least some examples, the one or more memory write instructions are a subset of the plurality of memory write instructions. In some corner cases, the one or more memory write instructions may correspond to the plurality of memory write instructions, e.g. if all memory addresses indicated by the plurality of memory write instructions are associated with the same memory module.

The method comprises executing 120 the one or more memory write instructions using previously unallocated memory of the memory module. For example, memory of the memory module may be addressed using a plurality of external memory addresses. Internally, the memory of the memory module may be addresses using a plurality of internal addresses. For example, the plurality of external addresses may be smaller than the plurality of internal addresses. The memory module may comprise more memory than is addressable using the plurality of external memory addresses. The remaining memory of the memory module may be used for maintenance of the memory module, e.g. for wear leveling. The unallocated memory may be memory used for wear levelling of the memory module. This may enable re-using a portion of the memory that may be required for maintenance of the memory module. In at least some examples, the unallocated memory is memory with an internal address without a mapping to an external memory address. This may enable using the memory without the changes being visible to other components of the computer system. Only after the updating of the one or more addresses, the changes might be visible.

In some examples, as shown in FIG. 1c, the method comprises providing 130 an execution completed acknowledgement for the one or more memory write instructions executed by the memory module 100 to a memory controller 200 associated with the memory module 100 after executing the one or more memory write instructions. The execution completed acknowledgement may be an acknowledgement (i.e. ACK) message provided from the memory module 100 to the processor 300 via the memory controller 200. In at least some examples, the execution completed acknowledgement may be a memory module-specific execution completed acknowledgement. In other words, the execution completed acknowledgement may (only) indicate, that the one or more memory write instructions of the plurality of write instructions associated with memory of the memory module 100 have been completed (but not committed). This may enable the processor to determine that all write instructions have been executed, and that thus the commit instruction may be sent to the memory modules via the memory controllers. The commit instruction may be obtained 140 in response to the execution acknowledgement message.

The memory module may require a trigger to apply the changes and update the one or more addresses. The commit instruction may be the trigger for updating 150 the one or more addresses. The method comprises obtaining (e.g. receiving) 140 the commit instruction for the group memory write instruction, e.g. from the memory controller 200. The commit instruction may indicate, that (all of) the addresses associated with the plurality of write instructions (comprising the one or more addresses associated with the one or more memory write instructions) are to be updated. In some examples, the commit instruction may indicate, that the address updates related to the plurality of write instructions and/or to the one or more memory write instructions are to be executed. The memory modules may identify the write instructions, for which the memory addresses are to be updated based on a group memory write instruction identifier comprised in the write instruction. The plurality of memory write instructions (e.g. the one or more memory write instructions) may be associated with the group memory write instruction identifier. The commit instruction may be valid for the group memory write instruction identifier associated with the plurality of memory write instructions.

The method further comprises updating 150 the one or more memory addresses based on the previously unallocated memory used for executing the one or more memory write instructions after (e.g. as a reaction to) obtaining the commit instruction for the group memory write instruction. For example, the one or more memory addresses may be physical addresses of the computer system 1000. A physical address may be a memory address that is used on an address bus of the computer system in order to enable a data bus to access a particular storage cell of memory, or a register of memory mapped I/O device. The one or more memory addresses may be external memory addresses used outside the memory module. Within the memory module, internal addresses may be used. For example, as shown in FIG. 1c, the method may comprise controlling 152 an address mapping data structure (e.g. a mapping table) of the memory module. The address mapping data structure may be stored in memory of the memory module. The address mapping data structure may comprise information related to a mapping between a plurality of external memory addresses (e.g. physical addresses) and a plurality of internal memory addresses of the memory module. In at least some examples, for each external address, the address mapping data structure comprises a field for the external address, a field for an internal address currently mapped to the external address, and a field for a group memory write instruction identifier associated with the external address. The field for the group memory write instruction identifier may be populated, if the one or more memory write instructions relate to the external address. The field for the group memory write instruction identifier may be used to identify the one or more memory addresses, which are associated with the group memory write instruction. The plurality of external memory addresses may comprise the one or more addresses associated with the memory of the memory module. The updating 150 of the one or more memory addresses may change the mapping between one or more external memory addresses of the plurality of external memory addresses and one or more internal memory addresses of the plurality of internal memory addresses associated with the memory of the memory module. The one or more external memory addresses may correspond to the one or more addresses, for which the mapping is changed. After changing the mapping, the execution of the group memory write instruction may be completed.

For example, the mapping between one or more external memory addresses of the plurality of external memory addresses and one or more internal memory addresses of the plurality of internal memory addresses may be changed atomically. The memory module (e.g. the processing circuitry/means for processing of the memory module controller device or apparatus) may comprise hardware circuitry for changing the mapping between one or more external memory addresses of the plurality of external memory addresses and one or more internal memory addresses of the plurality of internal memory addresses atomically.

In at least some examples, the memory of the memory module further comprises a data structure for incomplete atomic memory instructions, i.e. for memory write instructions of group memory write instructions that have been executed but not yet committed. The data structure for incomplete atomic memory instructions may comprise a mapping between first and second internal addresses. The first internal address may be an internal address mapped to an external memory address in the address mapping data structure before the updating of the one or more memory addresses. The second internal address may be an internal address mapped to the same external address in the address mapping data structure after the updating 150 of the one or more memory addresses. The second internal address may be a "shadow" internal memory address of the first internal address. In case of a power cycle, the data structure for incomplete atomic memory instructions may be used to determine which addresses are to be updated if a commit instruction arrives. The method may comprise, as shown in FIG. 1c, controlling 154 the data structure for incomplete atomic memory instructions. For example, entries may be added to the data structure for incomplete atomic memory instructions after executing the one or more memory write instructions. The method may comprise adding 156 one or more entries to the data structure for incomplete atomic memory instructions for the one or more memory write transactions, e.g. after executing the one or more memory write instructions. The method may further comprise removing the one or more entries (from the one or more memory write instructions) after obtaining the commit instruction and updating the one or more memory addresses. This may enable tracking, which group memory write instruction is still to be completed.

Within the above-mentioned data structures, the group memory write instruction identifier may be used to identify the entries that are associated with (i.e. belong to) a group memory write instruction. Within the data structure for incomplete atomic memory instructions and the address mapping data structure, the write instructions may be associated with a group memory write instruction by the group memory write instruction identifier of the group memory write instruction. For example, the data structure for incomplete atomic memory instructions may comprise a group memory write instruction identifier for each mapping between a first and a second internal address. The address mapping data structure may comprise a group memory write instruction identifier associated with the external address for each external address of the address mapping data structure associated with the one or more memory write instructions. The commit instruction may comprise the group memory write instruction identifier. Furthermore, the group memory write instruction, e.g. the one or more memory write instructions and/or the plurality of write instructions may (each) comprise the group memory write instruction identifier. As shown in FIG. 1c, the method may comprise identifying 158 one or more updates required within the address mapping data structure and identifying one or more mappings within the data structure for incomplete atomic memory instructions associated with the one or more updates based on the group memory write instruction identifier obtained with the commit instruction.

In at least some examples, as shown in FIG. 1c, the method comprises providing 160 a commit completed acknowledgement to a memory controller 200 associated with the memory module 100 after updating the one or more memory addresses. The commit completed acknowledgement may be an acknowledgement (i.e. ACK) message provided from the memory module 100 to the processor 300 via the memory controller 200. In at least some examples, the commit completed acknowledgement may be a memory module-specific commit completed acknowledgement. In other words, the commit completed acknowledgement may (only) indicate, that the one or more memory write instructions of the plurality of write instructions associated with memory of the memory module 100 have been committed by updating the one or more memory addresses of the memory associated with the memory module 100. This may enable the processor to determine that all the group write instruction has been successfully completed. In some examples, a power cycle is tolerated between obtaining the commit instruction and providing the commit completed acknowledgement. This may enable completing the group write instruction even if a power cycle of the computer system occurs.

In at least some examples, the memory module 100 comprises one of random access memory (RAM), dynamic RAM (DRAM), static RAM (SRAM), non-volatile memory or storage, any semiconductor memory, and it may be arranged in any architecture using any technology, e.g. phase change memory (PCM), dynamic random access memory (DRAM), flash memory, or DDR (double data rate memory). In at least some examples, the memory module 100 is a persistent memory module. The memory module 100 may comprise persistent memory. The one or more memory write instructions may be executed on persistent memory. The persistent memory may be based on Intel® 3D XPoint™. Intel and 3D XPoint are trademarks of Intel Corporation or its subsidiaries in the U.S. and/or other countries. In at least some examples, the memory module may be a Dual In-line Memory Module (DIMM), e.g. a DIMM comprising persistent memory.

Figure 2A:
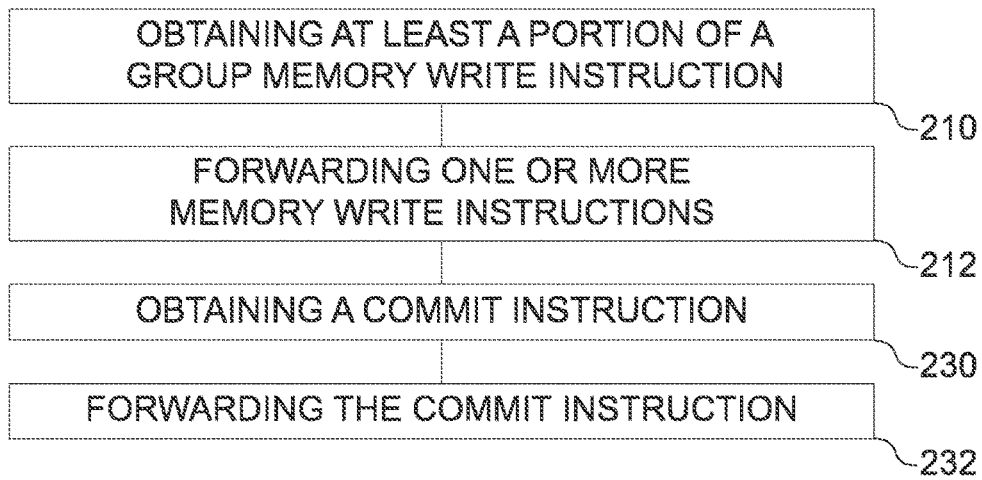
FIGS. 2a and 2b show flow charts of examples of a method for a memory controller.
Figure 2B:
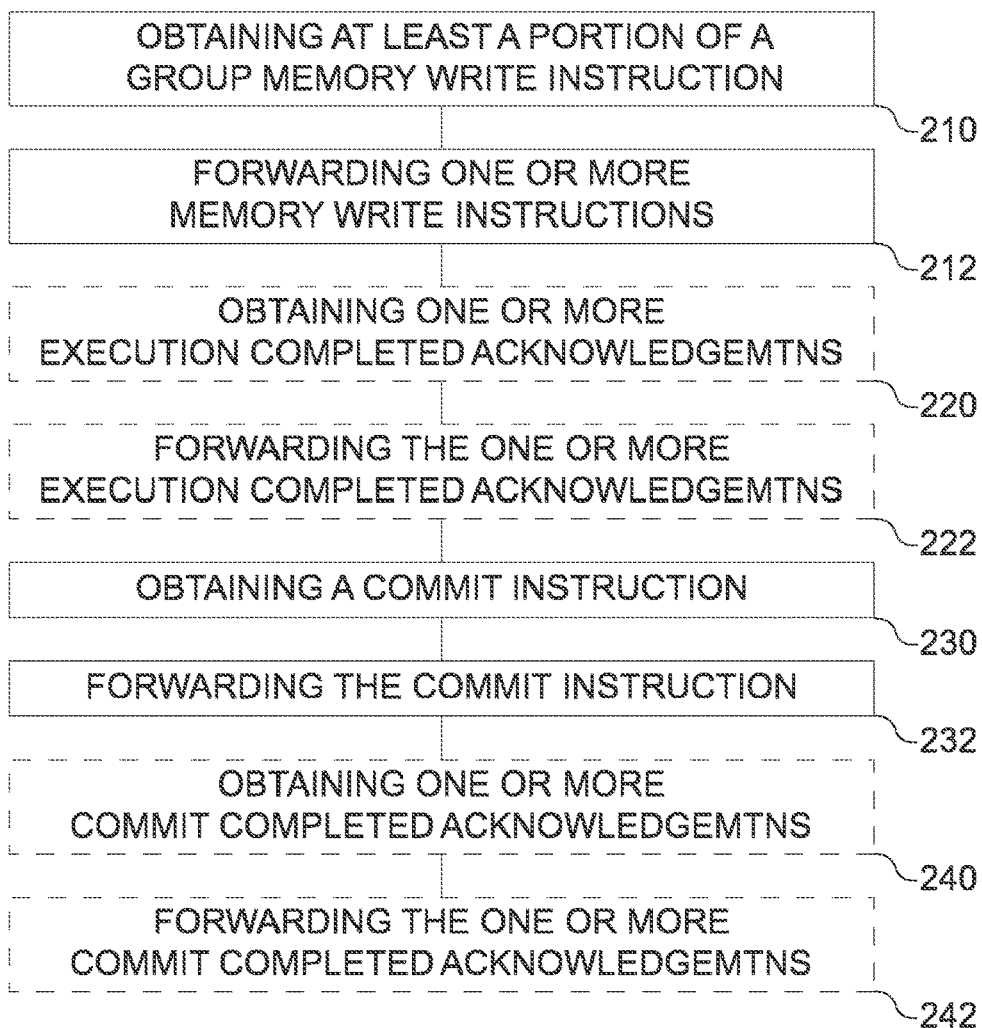
Figure 2C:
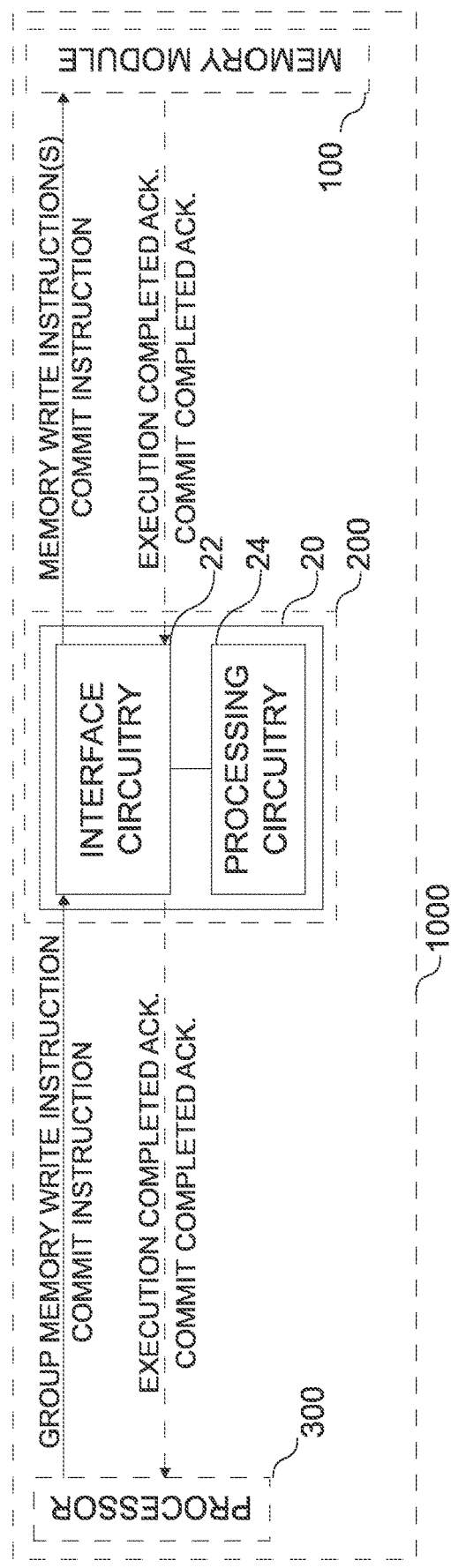
FIG. 2c shows a block diagram of an example of a memory controller apparatus or of a memory controller device.
Figure 3C:
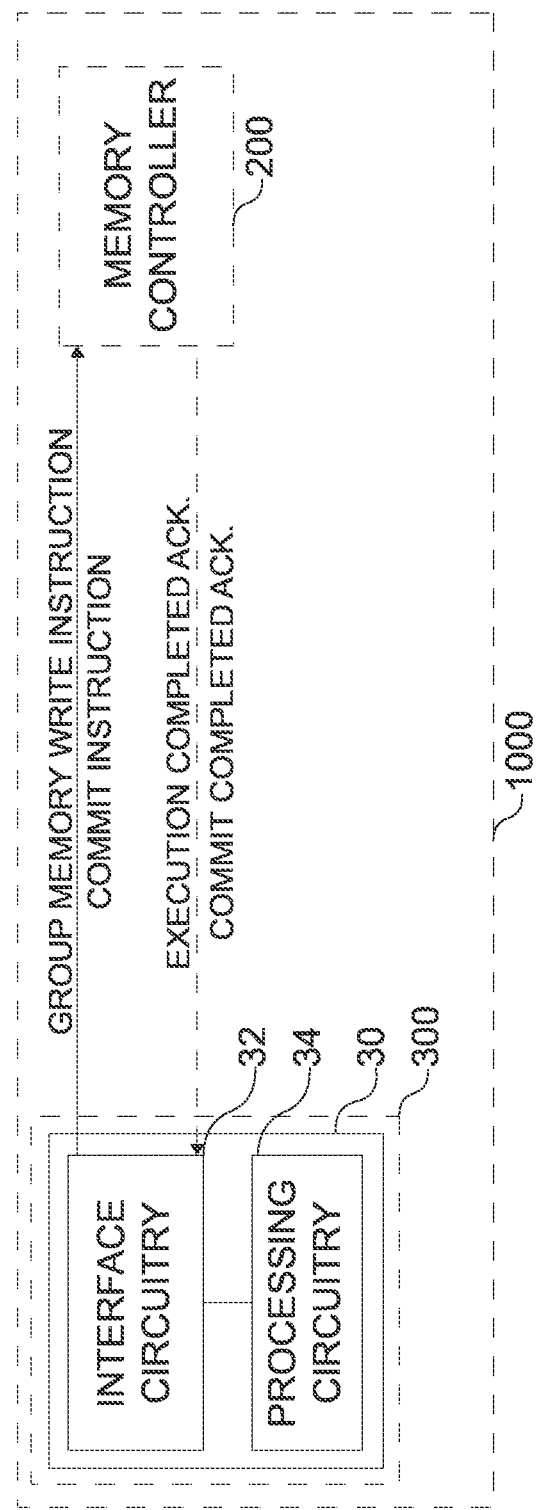
FIG. 3c shows a block diagram of an example of a processor apparatus or of a processor device.

The interface circuitry/means for communicating 12 (and/or interface circuitry/means for communicating 22 or 32 introduced in connection with FIG. 2c or 3c) may correspond to one or more inputs and/or outputs for receiving and/or transmitting information, which may be in digital (bit) values according to a specified code, within a module, between modules or between modules of different entities.

The processing circuitry/means for processing 14 (and/or processing circuitry/means for processing 24 or 34 introduced in connection with FIG. 2c or 3c) may be implemented using one or more processing units, one or more processing devices, any means for processing, such as a processor, a computer or a programmable hardware component being operable with accordingly adapted software. In other words, the described function of the processing circuitry/means for processing 14; 24; 34 may as well be implemented in software, which is then executed on one or more programmable hardware components. Such hardware components may comprise a general purpose processor, a Digital Signal Processor (DSP), a micro-controller, etc.

In at least some examples, the computer system 1000 is a server computer system, e.g. a server operating within a data center, a storage server or a database server. Alternatively, the computer system 1000 may be a personal computer system or a mobile computer system.

More details and aspects of the computer system 1000, the memory module 100, the method for a memory module 100 and/or the memory module controller apparatus/device 10 are mentioned in connection with the proposed concept or one or more examples described above or below (e.g. FIGS. 2a to 6). The computer system 1000, the memory module 100, the method for a memory module 100 and/or the memory module controller apparatus/device 10 may comprise one or more additional optional features corresponding to one or more aspects of the proposed concept or one or more examples described above or below.

FIGS. 2a and 2b show flow charts of examples of a method for a memory controller 200 of a computer system 1000, e.g. a memory controller 200 of the one or more memory controllers 200 and the computer system 1000 introduced in connection with FIG. 1a. The method comprises obtaining 210 at least a portion of a group memory write instruction. The group memory write instruction comprises a plurality of memory write instructions to be executed atomically. The portion of the group memory write instruction comprises one or more memory write instructions of the plurality of memory write instructions. The one or more memory write instructions relate to one or more memory addresses of memory associated with the memory controller. The method comprises forwarding 212 the one or more memory write instructions to one or more memory modules 100 (e.g. the memory module 100 introduced in connection with FIGS. 1a to 1d) associated with the memory controller. The method further comprises obtaining 230 a commit instruction for the group memory write instruction. The method further comprises forwarding 232 the commit instruction to the one or more memory modules. The method may be executed by the memory controller 200 of the computer system 1000.

FIG. 2c shows a block diagram of an example of a (corresponding) memory controller apparatus 20 or of a memory controller device 20 for a memory controller 200 of a computer system 1000. The described memory controller apparatus 20 corresponds to the memory controller device 20. The components of the memory controller device 20 are defined as component means, which correspond to the respective structural components of the memory controller apparatus 20. The memory controller apparatus 20 comprises interface circuitry 22 (e.g. means for communicating 22 of the memory controller device 20) configured to communicate with one or more memory modules 100 and with a processor 300 of the computer system 1000. The memory controller apparatus 20 comprises processing circuitry 24 (e.g. means for processing 24 of the memory controller device 20) configured to obtain at least a portion of a group memory write instruction (e.g. via the interface circuitry 22). The group memory write instruction comprises a plurality of memory write instructions to be executed atomically. The portion of the group memory write instruction comprises one or more memory write instructions of the plurality of memory write instructions. The one or more memory write instructions relate to one or more memory addresses of memory associated with the memory controller 200. The processing circuitry 24 is configured to forward the one or more memory write instructions to one or more memory modules 100 associated with the memory controller 200 (e.g. via the interface circuitry 22). The processing circuitry 24 is configured to obtain a commit instruction for the group memory write instruction (e.g. via the interface circuitry 22). The processing circuitry 24 is configured to forward the commit instruction to the one or more memory modules 100. In other words, the processing circuitry or means for processing 24 may be configured to execute the method introduced in connection with FIGS. 2a and/or 2b, e.g. in conjunction with the interface circuitry/means for communicating 22. FIGS. 2c further shows the memory controller 200 comprising the memory controller apparatus/ device 20, and the computer system 1000 comprising the memory controller 200 with the memory controller apparatus/device 20. The interface circuitry 22 is coupled with the processing circuitry 24.

The following description may relate to the computer system 1000, the memory controller 200, the method for the memory controller 200 and/or the memory controller apparatus/device 20.

In the method laid out in connection with FIG. 1a, the memory controller 200 is primarily used to forward instructions and acknowledgments provided from the processor 300 to the memory modules 100 or vice versa. For example, the memory controller 200 may be the memory controller for controlling the (main) memory of the computer system. The memory controller 200 may be a circuit that manages the flow of data going to and from the computer's (main) memory, e.g. between the processor 300 and the one or more memory modules 100. In some examples, the memory controller 200 may be an integrated memory controller, i.e. the processor 300 may comprise the memory controller 200. Alternatively, the memory controller 200 may be separate from the processor 300. In at least some examples, the computer system 1000 comprises the one or more memory modules 100. The one or more memory modules 100 may be associated with the memory controller 200. In other words, the memory controller 200 may supervise read and/or write requests of the processor 300 to the one or more memory modules 100.

The method comprises obtaining (e.g. receiving) 210 at least a portion of a group memory write instruction, e.g. from the processor 300. In some examples, the memory controller may receive the entire group memory write instruction from the processor, and the method may comprise identifying the one or more memory write instructions within the plurality of write instructions of the group memory write instruction. Alternatively, the memory controller might (only) obtain the one or more memory write instructions. In at least some examples, the one or more memory write instructions may comprise memory write instructions for different memory modules of the one or more memory modules. The method may comprise assigning the one or more memory write instructions to the one or more memory modules 100, and forwarding 212 (e.g. extracting and transmitting) the one or more memory write instructions accordingly. In at least some examples, the one or more memory write instructions obtained by the memory module 100 introduced in connection with FIGS. 1a to 1d may correspond to the one or more instructions forwarded by the memory controller 200, e.g. if the one or more memory write instructions relate to memory of a single memory controller. If the one or more memory write instructions relate to memory of more than one memory module 100, the one or more memory write instructions obtained by the by the memory module 100 introduced in connection with FIGS. 1a to 1d may correspond to a subset of the one or more memory write instruction forwarded by the memory controller 200.

In some examples, as shown in FIG. 2b, the method comprises obtaining (e.g. receiving) 220 one or more execution completed acknowledgements for the one or more memory write instructions executed by the one or more memory modules 100 from the one or more memory modules 100 in response to the forwarded one or more memory write instructions. The one or more execution completed acknowledgements may be acknowledgement (i.e. ACK) message provided from the one or more memory modules 100 to the processor 300 via the memory controller 200. In at least some examples, the one or more execution completed acknowledgements may be memory module-specific execution completed acknowledgements. In other words, the one or more execution completed acknowledgements may (only) indicate, that the one or more memory write instructions of the plurality of write instructions associated with memory of the one or more memory modules 100 have been completed (but not committed). The method may further comprise forwarding 222 (e.g. transmitting) the one or more execution completed acknowledgements to the processor 300 of the computer system 1000. For example, the one or more execution completed acknowledgements may be individually forwarded 222 to the processor 300 of the computer system 1000. Alternatively, the method may comprise accumulating the one or more execution completed acknowledgements, and forwarding the one or more execution completed acknowledgements in a combined form to the processor 300. This may enable the processor to determine that all write instructions have been executed, and that thus the commit instruction may be sent to the memory modules via the memory controllers. The commit instruction may be obtained in response to the forwarded one or more execution completed acknowledgements.

The method further comprises obtaining (e.g. receiving) 230 a commit instruction for the group memory write instruction (e.g. from the processor 300) and forwarding (e.g. transmitting) 232 the commit instruction to the one or more memory modules. In some examples, as further shown in FIG. 2b, the method comprises obtaining 240 one or more commit completed acknowledgements from the one or more memory modules 100 in response to the forwarded commit instruction. The method may further comprise forwarding 242 (e.g. transmitting) the one or more commit completed acknowledgements to a processor of the computer system 1000. For example, the one or more commit completed acknowledgements may be individually forwarded 242 to the processor 300 of the computer system 1000. Alternatively, the method may comprise accumulating the one or more commit completed acknowledgements, and forwarding the one or more commit completed acknowledgements in a combined form to the processor 300.

More details and aspects of the computer system 1000, the memory controller 200, the method for the memory controller 200 and/or the memory controller apparatus/device 20 are mentioned in connection with the proposed concept or one or more examples described above or below (e.g. FIG. 1a to 1d, 3a to 6). The computer system 1000, the memory controller 200, the method for the memory controller 200 and/or the memory controller apparatus/device 20 may comprise one or more additional optional features corresponding to one or more aspects of the proposed concept or one or more examples described above or below.

FIGS. 3a and 3b show flow charts of examples of a method for a processor 300 of a computer system 1000, e.g. the processor 300 and the computer system 1000 introduced in connection with FIG. 1a. The method comprises providing 310 a group memory write instruction to one or more memory controllers 200 of the computer system 1000. The group memory write instruction comprises a plurality of memory write instructions to be executed atomically. The method further comprises providing 330 a commit instruction to the one or more memory controllers. The method may be executed by the processor 300 of the computer system.

FIG. 3c shows a block diagram of an example of a (corresponding) processor apparatus 30 or of a processor device 30 for a processor 300 of the computer system 1000. The described processor apparatus 30 corresponds to the processor device 30. The components of the processor device 30 are defined as component means, which correspond to the respective structural components of the processor apparatus 30. The processor apparatus 30 comprises interface circuitry 32 (e.g. means for communicating 32 of the processor device 30) configured to communicate with one or more memory controllers 200 of the computer system 1000. The processor apparatus 34 comprises processing circuitry 34 (e.g. means for processing 34 of the processor device 30) configured to provide a group memory write instruction to one or more memory controllers 200 of the computer system 1000 (e.g. via the interface circuitry 32). The group memory write instruction comprises a plurality of memory write instructions to be executed atomically. The processing circuitry 34 is configured to provide a commit instruction to the one or more memory controllers 200 (e.g. via the interface circuitry 32). In other words, the processing circuitry or means for processing 34 may be configured to execute the method introduced in connection with FIGS. 3a and/or 3b, e.g. in conjunction with the interface circuitry/means for communicating 32. FIGS. 3c further shows the processor 300 comprising the processor apparatus/device 30, and the computer system 1000 comprising the processor 300 with the processor apparatus/device 30. The interface circuitry 32 is coupled with the processing circuitry 34.

The following description may relate to the computer system 1000, the processor 300, the method for the processor 300 and/or the processor apparatus/device 30.

In at least some examples, the (atomic) group memory write instruction may be initiated and/or controlled by the processor 300 of the computer system, e.g. by a core or by a coherence tracking agent for memory transactions of the processor 300. For example, the method may be executed by a coherence tracking agent for memory transactions of the processor. In some processor architectures, a Home Agent role of a Caching and Home Agent (CHA) may correspond to the coherence tracking agent of the processor 300. In at least some examples, the processor 300 may be a Central Processing Unit (CPU) of the computer system 1000.

The method comprises providing (e.g. transmitting) 310 a group memory write instruction to one or more memory controllers 200 of the computer system 1000. In at least some examples, the group memory write instruction may be obtained from a software application being executed by the processor 300. For example, the group memory write instruction may be obtained as instruction call of one or more instructions of an instruction set of the processor 300. In some examples, the entire group memory write instruction may be provided 310 to (all of) the one or more memory controllers 200. Alternatively, the group memory write instruction may be selectively provided 310 to the one or more memory controllers 200. For example, the group memory write instruction comprises a plurality of memory write instructions to be executed atomically. Each memory write instruction may relate to a memory address of memory of a memory module 100. Each memory module 100 may be associated with a memory controller 200. The providing 310 of the group memory write instruction may comprise selectively providing each memory write instruction of the plurality of memory write instructions (only) to the memory controller 200 of the one or more memory controllers 200 associated with the memory module 100 comprising the memory to which the memory write instruction relates.

In some examples, as shown in FIG. 3b, the method comprises determining (e.g. generating) 312 a group memory write instruction identifier. The group memory write instruction identifier may be a (unique) binary code that may be suitable for differentiating group memory write instructions. For example, a part of the group memory write instruction identifier may indicate a core of the processor 300 that has generated the group memory write instruction identifier. The method may comprise obtaining 314 the group memory write instruction from the software application and adding 316 the group memory write instruction identifier to the group memory write instruction provided 310 to the one or more memory controllers 200, e.g. embedding the group memory write instruction identifier within the group memory write instruction provided 310 to the one or more memory controllers 200. This may enable differentiating the group memory write instruction within the computer system.

In at least some examples, as further shown in FIG. 3b, the method comprises obtaining (e.g. receiving) 320 one or more execution completed acknowledgements from the one or more memory controllers 200 in response to the provided group memory write instruction. This may enable the processor to determine that all write instructions have been executed, and that thus the commit instruction may be sent to the memory modules via the memory controllers. The one or more execution completed acknowledgements may be acknowledgement (i.e. ACK) message provided from the one or more memory modules 100 to the processor 300 via the memory controller 200. In at least some examples, the one or more execution completed acknowledgements may be memory module-specific execution completed acknowledgements. In other words, the one or more execution completed acknowledgements may (only) indicate, that one or more memory write instructions of the plurality of write instructions associated with memory of the one or more memory modules 100 have been completed (but not committed). In some examples, the one or more execution completed acknowledgements may be obtained individually from the one or more memory controllers 200. Alternatively, the one or more execution completed acknowledgements may be obtained in combined from the one or more memory controllers (e.g. combined by memory controller of the one or more memory controllers 200).

The method comprises providing 330 a commit instruction to the one or more memory controllers. The commit instruction may be provided 330 after obtaining the one or more execution completed acknowledgements. In some examples, the method comprises comparing the one or more obtained execution completed acknowledgements with information related to one or more expected execution completed acknowledgements. The information related to the one or more expected execution completed acknowledgements may indicate a number and/or origin of execution completed acknowledgments that are required to indicate that (all of) the plurality of write instructions have been (successfully) executed by one or more memory modules of the computer system. The commit instruction may be provided 300 after/when (all) expected execution completed acknowledgements have been obtained.

In at least some examples, as further shown in FIG. 3b, the method comprises obtaining (e.g. receiving) 340 one or more commit completed acknowledgements from the one or more memory controllers 200 in response to the provided commit instruction. This may enable the processor to determine that all the group write instruction has been successfully completed. For example, the one or more commit completed acknowledgements may be obtained 340 individually from the one or more memory controllers. Alternatively, the one or more commit completed acknowledgements may be obtained 340 in combined in combined form from the one or more memory controllers 200 (e.g. combined by memory controller of the one or more memory controllers 200). Each of the one or more commit completed acknowledgements may indicate that a (single) memory module of the computer system 1000 has successfully committed one or more memory write instructions.

The method may comprise comparing 342 the one or more obtained commit completed acknowledgements with information related to one or more expected commit completed acknowledgements. The information related to the one or more expected commit completed acknowledgments may indicate a number and/or origin of commit completed acknowledgments that are required to indicate that (all of) the plurality of write instructions have been (successfully) committed by one or more memory modules of the computer system. The commit instruction may be provided anew if at least one of the one or more expected commit completed acknowledgements is missing. In other words, the method may comprise repeating the provision of the commit instruction to the one or more memory controllers if at least one of the one or more expected commit completed acknowledgements is missing.

In various examples, as further shown in FIG. 3b, the method comprises determining 344 a commit completed acknowledgement for the entire group memory write instruction based on the one or more obtained commit completed acknowledgements, e.g. based on the comparison of the one or more obtained commit completed acknowledgements with the information related to one or more expected commit completed acknowledgements. The commit completed acknowledgement for the entire group memory write instruction may indicate, that the (entire) group memory write instruction has been successfully executed and committed by the one or more memory controllers 200 and the associated memory modules 100. If (all of) the one or more expected commit completed acknowledgements, the commit completed acknowledgement may be provided 346 to a software application being executed by the processor. In other words, the method may comprise providing 346 the commit completed acknowledgement for the entire group memory write instruction to a software application being executed by the processor.

As further shown in FIG. 3b, the method may comprise providing 350 an instruction set with instructions for the group memory write instruction to applications being executed by the processor. For example, the instruction set of the processor may comprise the instructions for the group memory write instruction. The instruction set may comprise at least an instruction for beginning the group memory write instruction, and an instruction for terminating the group memory write instruction. In some examples, the instruction set comprises an instruction for inserting a memory write instruction between the instruction for beginning the group memory write instruction and the instruction for terminating the group memory write instruction. This may enable software applications to use the atomic group memory write instruction scheme.

More details and aspects of the computer system 1000, the processor 300, the method for the processor 300 and/or the processor apparatus/device 30 are mentioned in connection with the proposed concept or one or more examples described above or below (e.g. FIG. 1a to 2c, 4 to 6). The computer system 1000, the processor 300, the method for the processor 300 and/or the processor apparatus/device 30 may comprise one or more additional optional features corresponding to one or more aspects of the proposed concept or one or more examples described above or below.

At least some examples relate to hardware memory versioning in multi-persistent memory DIMMs.

Persistent memory technologies—such as Intel 3D XPoint—are a field of research and development. Intel and 3D XPoint are trademarks of Intel Corporation or its subsidiaries in the U.S. and/or other countries. One of the compelling values of persistent memory is the ability to "instantly" restart because data may not have to be copied from disk to memory (since memory is now persistent) and organized in in-memory data structures. This may be inherently different from other approaches, where disk has been the durable copy of data, and memory has been the working copy. Deviating from this model—while it brings the advantage of instant restart—it may also bring some challenges or new considerations when it comes to power failures.

One challenge arises from scenarios where there is a need to commit a group of writes together to persistent memory—"all or nothing commits." For example, if the fields for "preferred contact" in a system are updated, and this has name, phone number, and email—all 3 have to be updated together in persistent memory if they are updated, or none of them should be updated. Having just one field, for example, the name field, updated with a power failure occurring at that time—would result a mismatched phone number and email in persistent memory.

One approach to handle the above issue is to log the transaction first, and then write it. This approach may have significant overhead, since every write in a grouped transaction occurs twice. This might (significantly) impact an application's performance negatively, and may require software programming overhead. If an application does not log transactions periodically, all data might be considered "untrusted" on an unplanned application or server shutdown. This means that the entire dataset may be rebuilt or recopied, which may take a long time—diminishing the value of persistent memory.

For example, consider the case where two integers are part of a group commit. Each integer requires 32 bytes of persistent memory. If there is a power failure during this group commit, these 64 bytes of persistent memory are potentially inconsistent. For these 64 bytes of inconsistent data within a larger set of data, say multi-terabytes, the entire data set might have to be rebuilt. This rebuilding process may be wasteful, considering that almost all of the data is in a consistent state. Other approaches may provide no hardware solutions that allow all of the data to be trusted, in scenarios where all-or-nothing consistency is required. The only means to do this in some approaches may be by logging transactions in software.

Implementing micro-logs in software for all writes to persistent memory may be cumbersome and error prone. The complexity of the implementation may increase dramatically and code maintenance may become a challenge. In contrast, examples may be simple and intuitive from a software API perspective because they may offer an ISA-based (Instruction Set Architecture-based) solution, e.g. using instructions ATOMIC_GROUP_BEGIN (e.g. the instruction for beginning the group memory write instruction) and ATOMIC_GROUP_END (e.g. instruction for terminating the group memory write instruction).

Furthermore, software implementations may require additional writes to persistent memory in order to implement log structures. This might not only decrease performance but additionally add to the wear-out of the underlying device.

Often when there is a hardware/power failure, it may be important for all-or-nothing consistency guarantees to be applicable to the data at rest on the DIMMs (for example, a customer might just move the DIMMs to another system). Software-based approaches might require redo/undo logging code to be executed on the new system in order to guarantee integrity for all-or-nothing consistency. Therefore the approach of at least some examples may offer "integrity at rest" after a power failure, as there might be no need to replay the log in software in order to achieve consistency. This may result in a simpler and faster restart, whether the DIMMs are moved to a new system or not.

Examples may provide a hardware based mechanism to implement all-or-nothing transactions for persistent memory with an intuitive and simple software interface. From the software perspective, in an exemplary implementation, a developer may mark a region of all-or-nothing commits (e.g. the group memory write instruction) with the instructions ATOMIC_GROUP_BEGIN and ATOMIC_GROUP_END, which may signify that all stores within this region have to be treated as atomic and executed non-temporally:

ATOMIC_GROUP_BEGIN
Store "DataA"
Store "DataB"
. . .
ATOMIC_GROUP_END

The core might then assign a unique transaction ID to all stores in the transaction, which may be used by the AIT cache in the persistent memory DIMMs to implement shadow mappings and ADR-enabled AIT atomic mapping changes within a set of persistent memory DIMMs. At least some examples piggyback on existing AIT logic for wear leveling to have hardware versioning. Once the transaction is committed, the AIT mapping (e.g. within the address mapping data structure) may be switched to the updated variables (e.g. by updating the one or more memory addresses), and the addresses corresponding to the previous values of the variables may be released.

At least some examples implement all-or-nothing transactions, which may provide a simpler approach than software-based approaches, and which may improve an adoption of persistent memory devices.

Figure 4A:
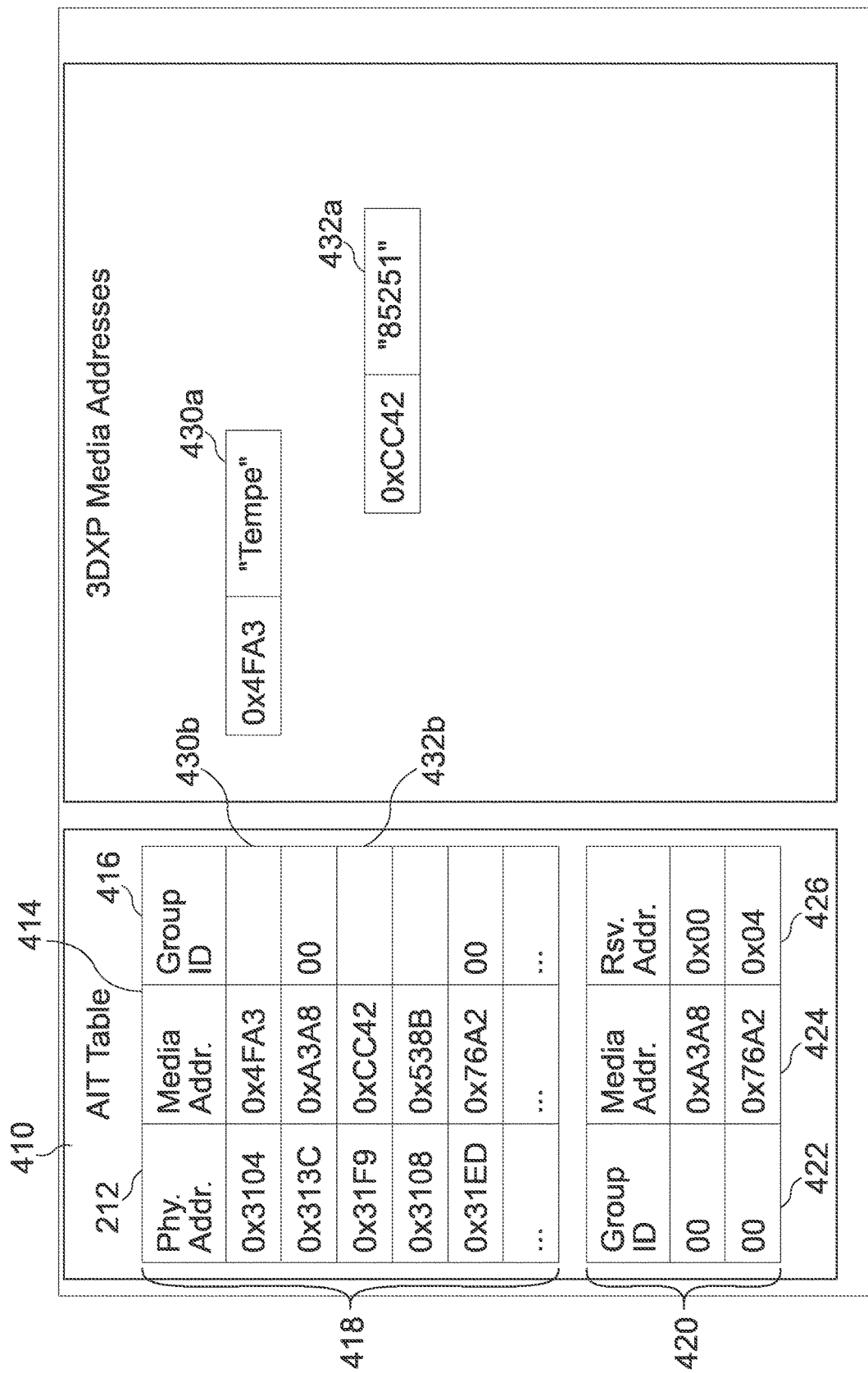

FIGS. 4a to 4f show a sequence of an example of how all-or-nothing transactions may be implemented in hardware. FIGS. 4a to 4f show AIT table 410 with a first data structure 418 (the AIT table, e.g. the address mapping data structure) with columns Physical Address 412 (e.g. the external memory address), Media Address 414 (e.g. the internal address) and Group Identifier 416 (e.g. the group memory write instruction identifier), and a second data structure 420 (the group table, e.g. the data structure for incomplete atomic memory instructions) with columns Group ID 422, Media Address 424 and Reserved/Shadow Address 426. FIG. 4a further shows a first variable 430a stored at media address 0x4FA3, which is mapped to Physical Address 0x3104 in row 430b of the first data structure, and a second variable 432a stored at media address 0xCC42, which is mapped to Physical Address 0x31F9 in row 432*b* of the first data structure. FIG. 4*a* shows the initial state showing locations of the "Tempe" (the first variable) and "85251" (the second variable) data in persistent memory. They both have entries in the AIT table 440, and they may be updated atomically. In FIG. 4*b*, , "Tempe" (previously 430*a*/230*b*) is assigned a group ID 434*a* in the AIT table, and an entry 434*b* showing the shadow mapping is added to the group table. In FIG. 4*c,* the new value "Chandler" 434*c* is written to the address of the shadow mapping 434*b*. In FIG. 4*d,* "85251" 436*a* (previously 432*a*/232*b*) is assigned the same group ID as "Tempe", and the shadow mapping is recorded in the group table 436*b*. The new value "85226" 436*c* is written to the address of the shadow mapping. In FIG. 4*e,* once the commit command (e.g. the commit instruction) is broadcasted, the AIT table entries are updated 434*d;* 434*e* (e.g. in updating of the one or more addresses) to show the addresses of the new values. In FIG. 4*f,* the group IDs are removed from the AIT table, the entries in the group table are removed, and the addresses containing the old values are released 438; 440. The values "Chandler" and "85226" have been updated atomically.

One basic concept of at least some examples is that a particular application running in a core X can start a transaction set of memory operations. Note that each transaction may target different DIMMs (Dual In-line Memory Modules) inside the platform. Once the transaction is finished, the core (e.g. the processor, on behalf of the application) may trigger a commit command broadcast (e.g. the commit instruction) to all the different memory channels of the platform that the transaction is finished. The DIMMS (e.g. the memory module) may commit the transactional data stored in temporal range of the persistent memory to the target persistent memory ranges (e.g. by updating the one or more memory addresses).

Caching Agents (CA/CHA) may be coherency agents within a node that process memory space requests from the cores within the same node. ODI may be an acronym for On-Die-Interconnect. Cores use a Super Queue (SQ) structure to store ODI requests that are sent to the CHA. A Home Agent (HA) may be responsible for handling memory requests from the CHAs and acting as a Home for a part of the memory space. One die might have multiple Homes across which the system memory space physical addresses are distributed.

Coherence Domain, Coherent Domain may denote (informally) the groups of cores in a system together with memory spaces to which they can perform load and store operations, where, the LOAD of any location returns the most recent value sent to that location by another core or CHA in the group. UPI (Ultra Path Interconnect), QPI (Quick Path Interconnect) and KTI (Keizer Technology Interconnect) may be inter socket high speed links over which requests or data may be forwarded from/to a core in a first socket to/from caches or HAs in a second socket in the node that implements a common coherency domain for the sockets. The Host Fabric Interface (HFI) may be an inter-node high speed network interface, through which memory space requests are forwarded from a first or "local" node to a second or "remote" node, and through which data, messages, packets, etc. are sent back to the local node, by the second node through the latter's HFI. DDR (Double Data Rate), HBM (High Bandwidth Memory) and SXP (3D XPoint) may be multiple tiers of memory addressable within a coherent domain. SXP Pooled Memory may be high capacity memory, accessible through HFI, and shared across nodes. A multi-node system or cluster may consist of two or more coherent domains between whom requests and responses are performed over their HFIs. Such requests and responses may travel through switches that route data between the HFIs. For example HPC or Data Centers may be composed by N clusters or servers that can communicate with each other using the fabric. Using the fabric (like STL), each coherent domain can expose some address regions to the other coherent domains. Memory Controllers may act as interfaces for the physical memories. Memories may work in two main modes: flat mode or memory side cache. Flat memories may act as memory storage devices. In the Memory side cache mode, a memory device may act as a cache for flat memories that reside in other domains. Memory controllers providing access to this last type of memories may implement both cache and memory access logic.

At least some examples may result in hardware changes: The core may expose two new instructions that are used to create and commit a group that includes a set of memory transaction to be stored atomically:

ATOMIC_GROUP_BEGIN
    Store "Chandler"
    Store "85226"
    ATOMIC_GROUP_END

As described in the flow below, the start instruction may create a unique number ID (e.g. the group memory write instruction) based on a free counter and the local ID of the core. For example: 1144 could represent the $11^{th}$ group transaction for core number 44. Once the group end transaction is executed, the ID may be broadcasted to the different memory controllers managing the DIMMs in order to commit the transaction. The DIMMs may commit the data (if any) and send an acknowledgement (e.g. the commit completed acknowledgement) back to a master the CHA. The CHA may count how many ACKs have been received from that particular TID and may consider the transaction done once all of them have responded.

In the case that there is a failure in between:

(a) Once the power failure is identified, CHA may store in the temporary persistent buffer that the transaction has not been totally committed.

(b) Once the platform is booted again, the CHA may read from the temporary buffer the pending committing transactions (e.g. from the address mapping data structure and/or from the data structure for incomplete atomic memory instructions) and may spawn a commit again to all the DIMMs. The DIMMs with pending commits in the AIT may perform the commits and ACK to the master.

The Core may expose new write instructions in order to specify that a particular write belongs to a particular transaction group. As described below when this instruction is executed, the group ID may be propagated from the core, to the caching agent, and finally to the memory controller. The memory controller may propagate both write operations, the address, payload, and the group ID for the transaction.

Figures 1, 5:
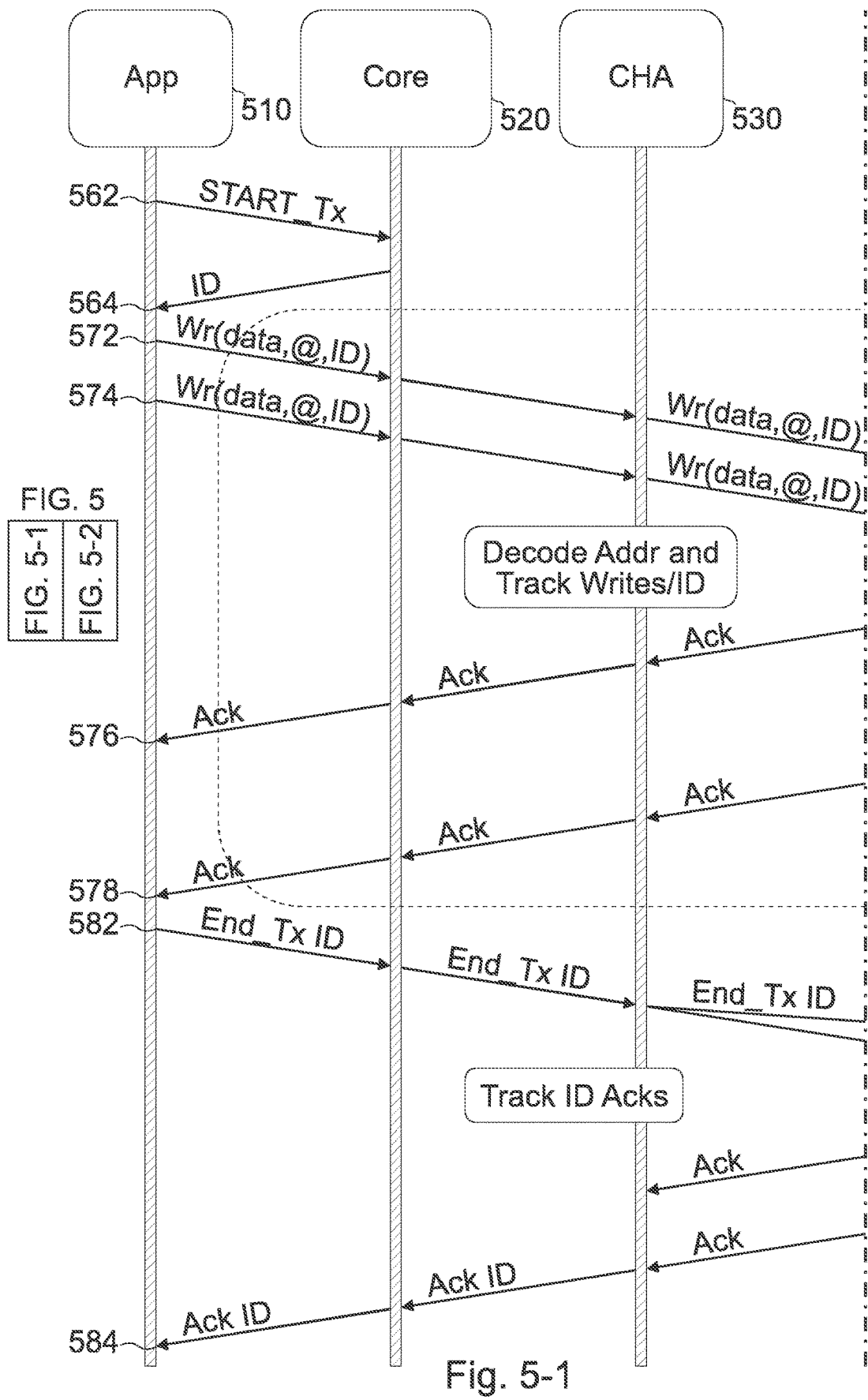
FIGS. 5-1 and 5-2 combine to form FIG. 5 which shows a flow chart according to an example.
Figures 2, 5:
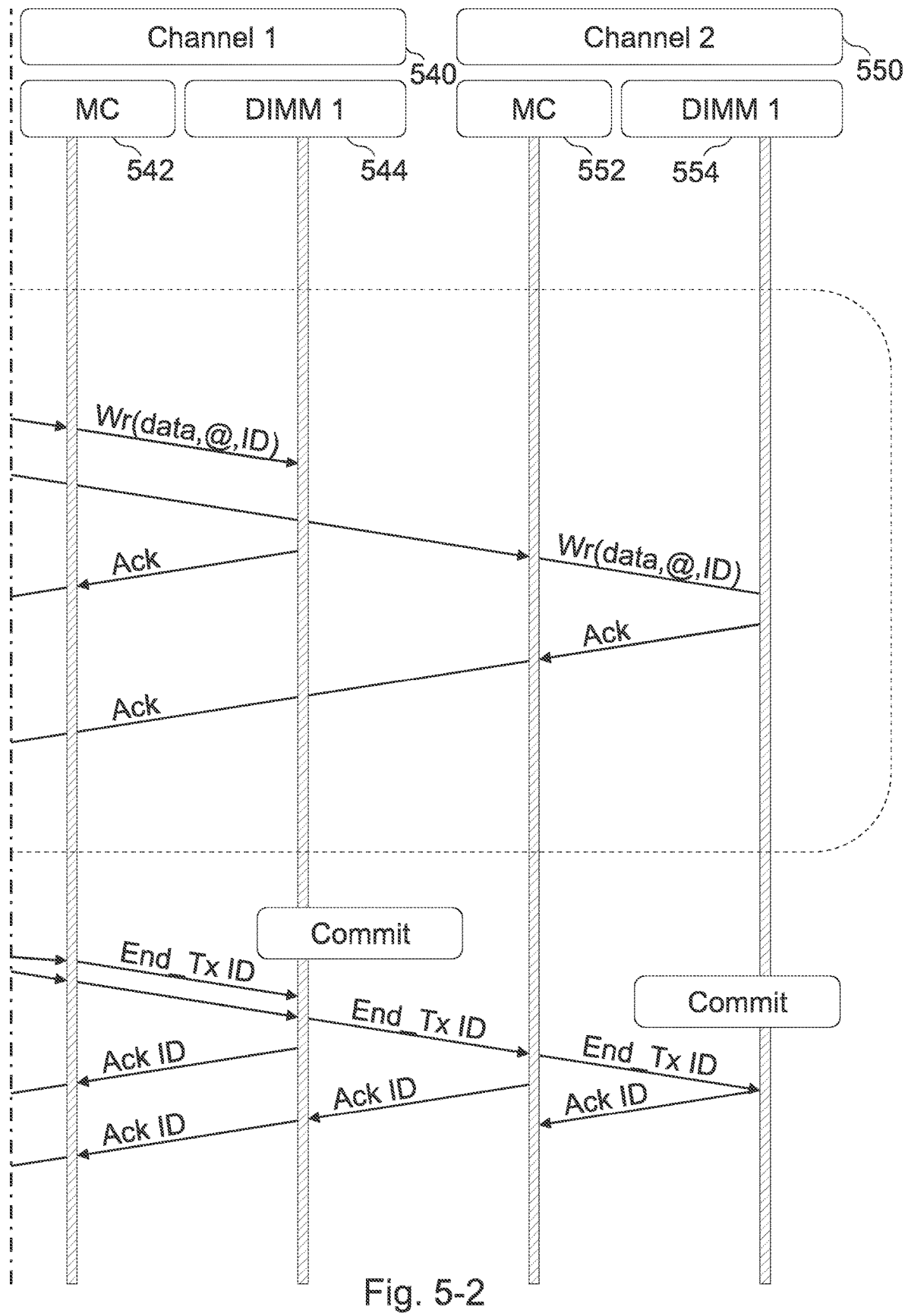
Figure 6:
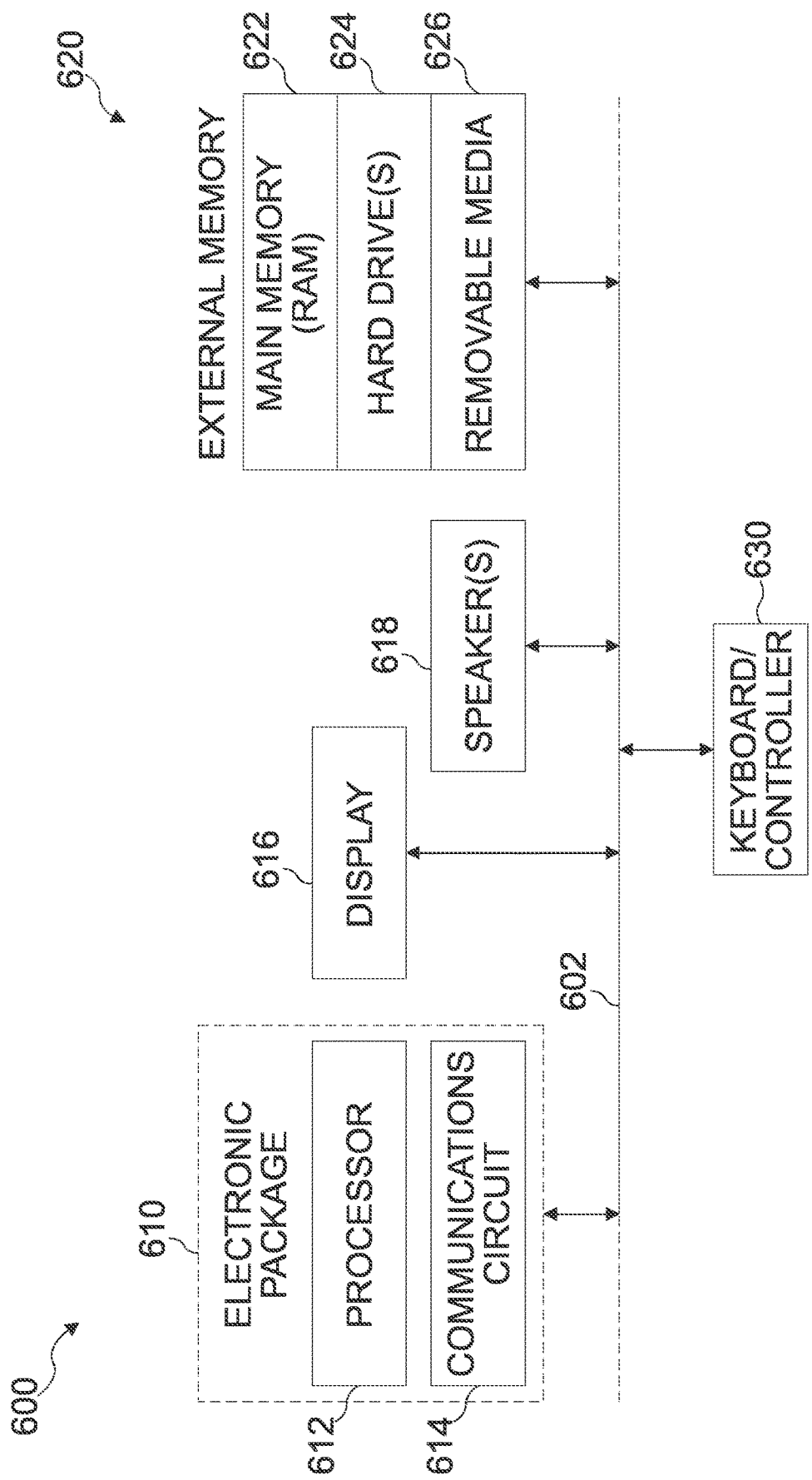
FIG. 6 shows a block diagram of an electronic apparatus or computer system incorporating at least one memory module, memory controller, processor, corresponding controller apparatuses or devices, or one of the methods described herein.

FIG. 5 shows a flow chart according to an example. FIG. 5 shows the entities Application 510, Core 520, CHA 530, (memory) channel 1 540 with a memory controller 542 and DIMM1 544 of channel 1 540, and (memory) channel 2 550 with a memory controller 552 and DIMM1 554 of channel 2 550. For example, the processor 300 introduced in connection with FIGS. 1*a* to 3*c* may comprise the Core 520 and the CHA 530. The memory controllers 542; 544 may correspond to memory controller 200 introduced in connection with FIGS. 1*a* to 3*c,* and DIMM1 544; 554 may correspond to the memory module 200 introduced in connection with FIGS. 1*a* to 3*c*. In a first operation 562, a Start Transmission instruction is provided from Application 510 to Core 520, which returns 564 a group identifier. Subsequently, write instructions 572 and 574 are provided with data and the group ID from the Application 510 to the CAH 530, which forwards the write operations to the Memory Controllers 542; 552 of the first and second channels. The Memory Controllers provide the write instructions to the respective DIMMs 544; 554. The CHA 530 may decode the addresses and track the writes of the group ID. The DIMMs 544; 554 may return acknowledgements 576; 578 (e.g. execution completed acknowledgements) to their respective Memory Controllers 552; 542, which forward the acknowledgements to the CHA 530. The CHA 530 may forward the acknowledgements to the Core 520, which may forward the acknowledgements 576 and 578 to the Application 510. In a subsequent operation, the Application 510 provides an End Transmission instruction 582 with the group ID to the Core 520, which forwards it to the CHA 530. The CHA transmits the End Transmission instruction 582 (e.g. as commit instructions) to the Memory Controllers 542; 544, which provide the instruction 582 to the respective DIMMs 544; 554. After committing the writes, the DIMMs 544; 554 provide an acknowledgement (e.g. the commit completed acknowledgement) with the group IDs to the respective Memory Controllers 542; 552, which forward the respective acknowledgements to the CHA, which tracks the acknowledgements belonging to the group ID. After all acknowledgements have been received by the CHA 530, the CHA provides an acknowledgement to the Core 520, which forwards the acknowledgement to the Application 510.

The DIMM architecture may be extended in the following ways:

The AIT table may include a new field associating the transaction ID to the memory transaction group, if any. Otherwise it may be empty.

The DIMM may include a new table that maps a particular group ID to the area of the temporary persistent storage where the memory operations that have not been committed are stored.

The persistent device may expose a new area that is used to store the temporary non-committed memory operations aforementioned.

The DIMM may include a new logic that is responsible to implement the flow already mentioned (commit a particular transaction and send ACK to the master DIMM).

The aspects and features mentioned and described together with one or more of the previously detailed examples and figures, may as well be combined with one or more of the other examples in order to replace a like feature of the other example or in order to additionally introduce the feature to the other example.

Example 1 relates to a method for a memory module 100 of a computer system 1000. The method includes Obtaining 110 one or more memory write instructions of a group memory write instruction, wherein the group memory write instruction includes a plurality of memory write instructions to be executed atomically, wherein the one or more memory write instructions relate to one or more memory addresses associated with memory of the memory module. The method includes Executing 120 the one or more memory write instructions using previously unallocated memory of the memory module. The method includes Obtaining 140 a commit instruction for the group memory write instruction. The method includes Updating 150 the one or more memory addresses based on the previously unallocated memory used for executing the one or more memory write instructions after obtaining the commit instruction for the group memory write instruction.

In Example 2, the subject matter of example 1 or any of the Examples described herein may further include, that the plurality of memory write instructions is associated with a group memory write instruction identifier, wherein the commit instruction is valid for the group memory write instruction identifier associated with the plurality of memory write instructions.

In Example 3, the subject matter of one of the examples 1 to 2 or any of the Examples described herein may further include, that the method includes providing 130 an execution completed acknowledgement for the one or more memory write instructions executed by the memory module 100 to a memory controller 200 associated with the memory module 100 after executing the one or more memory write instructions, wherein the commit instruction is obtained in response to the execution acknowledgement message.

In Example 4, the subject matter of one of the examples 1 to 3 or any of the Examples described herein may further include, that the method includes providing 160 a commit completed acknowledgement to a memory controller 200 associated with the memory module 100 after updating the one or more memory addresses.

In Example 5, the subject matter of example 4 or any of the Examples described herein may further include, that a power cycle is tolerated between obtaining the commit instruction and providing the commit completed acknowledgement.

In Example 6, the subject matter of one of the examples 1 to 5 or any of the Examples described herein may further include, that the unallocated memory is memory used for wear levelling of the memory module.

In Example 7, the subject matter of one of the examples 1 to 6 or any of the Examples described herein may further include, that the method includes controlling 152 an address mapping data structure of the memory module, wherein the address mapping data structure includes information related to an mapping between a plurality of external memory addresses and a plurality of internal memory addresses of the memory module, wherein the updating 150 of the one or more memory addresses changes the mapping between one or more external memory addresses of the plurality of external memory addresses and one or more internal memory addresses of the plurality of internal memory addresses.

In Example 8, the subject matter of example 7 or any of the Examples described herein may further include, that the unallocated memory is memory with an internal address without a mapping to an external memory address.

In Example 9, the subject matter of one of the examples 7 to 8 or any of the Examples described herein may further include, that for each external address the address mapping data structure includes a field for the external address, a field for an internal address currently mapped to the external address, and a field for a group memory write instruction identifier associated with the external address, wherein the field for the group memory write instruction identifier is populated, if the one or more memory write instructions relate to the external address.

In Example 10, the subject matter of one of the examples 7 to 9 or any of the Examples described herein may further include, that the method includes controlling 154 a data structure for incomplete atomic memory instructions, wherein the data structure for incomplete atomic memory instructions includes a mapping between first and second internal addresses, wherein the first internal address is an internal address mapped to an external memory address in the address mapping data structure before the updating of the one or more memory addresses, and wherein the second internal address is an internal address mapped to the same external address in the address mapping data structure after the updating 150 of the one or more memory addresses.

In Example 11, the subject matter of example 10 or any of the Examples described herein may further include, that the method includes adding 156 one or more entries to the data structure for incomplete atomic memory instructions for the one or more memory write transactions, and wherein the method includes removing 157 the one or more entries after updating the one or more memory addresses.

In Example 12, the subject matter of example 11 or any of the Examples described herein may further include, that the data structure for incomplete atomic memory instructions includes a group memory write instruction identifier for each mapping between a first and a second internal address, wherein the address mapping data structure includes a group memory write instruction identifier associated with the external address for each external address of the address mapping data structure associated with the one or more memory write instructions, wherein the commit instruction includes a group memory write instruction identifier, wherein the method includes identifying 158 one or more updates required within the address mapping data structure and identifying one or more mappings within the data structure for incomplete atomic memory instructions associated with the one or more updates based on the a group memory write instruction identifier obtained with the commit instruction.

In Example 13, the subject matter of one of the examples 1 to 12 or any of the Examples described herein may further include, that the memory module 100 is a persistent memory module.

Example 14 relates to a method for a memory controller 200 of a computer system 1000. The method includes Obtaining 210 at least a portion of a group memory write instruction, wherein the group memory write instruction includes a plurality of memory write instructions to be executed atomically, wherein the portion of the group memory write instruction includes one or more memory write instructions of the plurality of memory write instructions, wherein the one or more memory write instructions relate to one or more memory addresses of memory associated with the memory controller. The method includes Forwarding 212 the one or more memory write instructions to one or more memory modules 100 associated with the memory controller. The method includes Obtaining 230 a commit instruction for the group memory write instruction. The method includes Forwarding 232 the commit instruction to the one or more memory modules.

In Example 15, the subject matter of example 14 or any of the Examples described herein may further include, that the method includes obtaining 220 one or more execution completed acknowledgements for the one or more memory write instructions executed by the one or more memory modules 100 from the one or more memory modules 100 in response to the forwarded one or more memory write instructions, wherein the method further includes forwarding 222 the one or more execution completed acknowledgements to a processor of the computer system 1000, wherein the commit instruction is obtained in response to the forwarded one or more execution completed acknowledgements.

In Example 16, the subject matter of one of the examples 14 to 15 or any of the Examples described herein may further include, that the method includes obtaining 240 one or more commit completed acknowledgements from the one or more memory modules 100 in response to the forwarded commit instruction, wherein the method further includes forwarding 242 the one or more commit completed acknowledgements to a processor of the computer system 1000.

Example 17 relates to a method for a processor of a computer system 1000. The method includes Providing 310 a group memory write instruction to one or more memory controllers 200 of the computer system 1000, wherein the group memory write instruction includes a plurality of memory write instructions to be executed atomically. The method includes Providing 330 a commit instruction to the one or more memory controllers.

In Example 18, the subject matter of example 17 or any of the Examples described herein may further include, that the method includes obtaining 320 one or more execution completed acknowledgements from the one or more memory controllers 200 in response to the provided group memory write instruction, wherein the commit instruction is provided 330 after obtaining the one or more execution completed acknowledgements.

In Example 19, the subject matter of one of the examples 17 to 18 or any of the Examples described herein may further include, that the method includes obtaining 340 one or more commit completed acknowledgements from the one or more memory controllers 200 in response to the provided commit instruction.

In Example 20, the subject matter of example 19 or any of the Examples described herein may further include, that the method includes comparing 342 the one or more obtained commit completed acknowledgements with information related to one or more expected commit completed acknowledgements, wherein the commit instruction is provided anew if at least one of the one or more expected commit completed acknowledgements is missing.

In Example 21, the subject matter of example 20 or any of the Examples described herein may further include, that the method includes determining 344 a commit completed acknowledgement for the entire group memory write instruction based on the one or more obtained commit completed acknowledgements, wherein the method includes providing 346 the commit completed acknowledgement for the entire group memory write instruction to a software application being executed by the processor.

In Example 22, the subject matter of one of the examples 17 to 21 or any of the Examples described herein may further include, that the method is executed by a coherence tracking agent for memory transactions of the processor.

In Example 23, the subject matter of one of the examples 17 to 22 or any of the Examples described herein may further include, that the method includes determining 312 a group memory write instruction identifier, wherein the method includes obtaining 314 the group memory write instruction from the software application and adding 316 the group memory write instruction identifier to the group memory write instruction provided 310 to the one or more memory controllers 200.

In Example 24, the subject matter of one of the examples 17 to 23 or any of the Examples described herein may further include, that the method includes providing 350 an instruction set with instructions for the group memory write instruction to applications being executed by the processor, wherein the instruction set includes at least an instruction for beginning the group memory write instruction, and an instruction for terminating the group memory write instruction.

Example 25 relates to a memory module controller device 10 for a memory module 100 of a computer system 1000. The memory module controller device 10 includes means for communicating 12 with a memory controller 200 of the computer system 1000. The memory module controller device 10 includes means for processing 14 configured for obtaining one or more memory write instructions of a group memory write instruction, wherein the group memory write instruction includes a plurality of memory write instructions to be executed atomically, wherein the one or more memory write instructions relate to one or more memory addresses associated with memory of the memory module 100. The means for processing 14 is configured for executing the one or more memory write instructions using previously unallocated memory of the memory module 100. The means for processing 14 is configured for obtaining a commit instruction for the group memory write instruction. The means for processing 14 is configured for updating the one or more memory addresses based on the previously unallocated memory used for executing the one or more memory write instructions after obtaining the commit instruction for the group memory write instruction.

In Example 26, the subject matter of example 25 or any of the Examples described herein may further include, that the plurality of memory write instructions is associated with a group memory write instruction identifier, wherein the commit instruction is valid for the group memory write instruction identifier associated with the plurality of memory write instructions.

In Example 27, the subject matter of one of the examples 25 to 26 or any of the Examples described herein may further include, that the means for processing 14 is configured for providing an execution completed acknowledgement for the one or more memory write instructions executed by the memory module 100 to a memory controller 200 associated with the memory module 100 after executing the one or more memory write instructions, wherein the commit instruction is obtained in response to the execution acknowledgement message.

In Example 28, the subject matter of one of the examples 25 to 27 or any of the Examples described herein may further include, that the means for processing 14 is configured for providing a commit completed acknowledgement to a memory controller 200 associated with the memory module 100 after updating the one or more memory addresses.

In Example 29, the subject matter of example 28 or any of the Examples described herein may further include, that a power cycle is tolerated between obtaining the commit instruction and providing the commit completed acknowledgement.

In Example 30, the subject matter of one of the examples 25 to 29 or any of the Examples described herein may further include, that the unallocated memory is memory used for wear levelling of the memory module 100.

In Example 31, the subject matter of one of the examples 25 to 30 or any of the Examples described herein may further include, that the means for processing 14 is configured for controlling an address mapping data structure of the memory module 100, wherein the address mapping data structure includes information related to an mapping between a plurality of external memory addresses and a plurality of internal memory addresses of the memory module 100, wherein the updating of the one or more memory addresses changes the mapping between one or more external memory addresses of the plurality of external memory addresses and one or more internal memory addresses of the plurality of internal memory addresses.

In Example 32, the subject matter of example 31 or any of the Examples described herein may further include, that the unallocated memory is memory with an internal address without a mapping to an external memory address.

In Example 33, the subject matter of one of the examples 31 to 32 or any of the Examples described herein may further include, that for each external address the address mapping data structure includes a field for the external address, a field for an internal address currently mapped to the external address, and a field for a group memory write instruction identifier associated with the external address, wherein the field for the group memory write instruction identifier is populated, if the one or more memory write instructions relate to the external address.

In Example 34, the subject matter of one of the examples 31 to 33 or any of the Examples described herein may further include, that the means for processing 14 is configured for controlling a data structure for incomplete atomic memory instructions, wherein the data structure for incomplete atomic memory instructions includes a mapping between first and second internal addresses, wherein the first internal address is an internal address mapped to an external memory address in the address mapping data structure before the updating of the one or more memory addresses, and wherein the second internal address is an internal address mapped to the same external address in the address mapping data structure after the updating of the one or more memory addresses.

In Example 35, the subject matter of example 34 or any of the Examples described herein may further include, that the means for processing 14 is configured for adding one or more entries to the data structure for incomplete atomic memory instructions for the one or more memory write transactions, and wherein the means for processing 14 is configured for removing the one or more entries after updating the one or more memory addresses.

In Example 36, the subject matter of example 35 or any of the Examples described herein may further include, that the data structure for incomplete atomic memory instructions includes a group memory write instruction identifier for each mapping between a first and a second internal address, wherein the address mapping data structure includes a group memory write instruction identifier associated with the external address for each external address of the address mapping data structure associated with the one or more memory write instructions, wherein the commit instruction includes a group memory write instruction identifier, wherein the means for processing 14 is configured for identifying one or more updates required within the address mapping data structure and identifying one or more mappings within the data structure for incomplete atomic memory instructions associated with the one or more updates based on the group memory write instruction identifier obtained with the commit instruction.

In Example 37, the subject matter of one of the examples 25 to 36 or any of the Examples described herein may further include, that the memory module 100 is a persistent memory module 100.

Example 38 relates to a memory controller device 20 for a memory controller 200 of a computer system 1000. The memory controller device 20 includes means for communicating 22 with one or more memory modules 100 and with a processor 300 of the computer system 1000. The memory controller device 20 includes means for processing 24 configured for obtaining at least a portion of a group memory write instruction, wherein the group memory write instruction includes a plurality of memory write instructions to be executed atomically, wherein the portion of the group memory write instruction includes one or more memory write instructions of the plurality of memory write instructions, wherein the one or more memory write instructions relate to one or more memory addresses of memory associated with the memory controller 200. The means for processing 24 is configured for forwarding the one or more memory write instructions to one or more memory modules 100 associated with the memory controller 200. The means for processing 24 is configured for obtaining a commit instruction for the group memory write instruction. The means for processing 24 is configured for forwarding the commit instruction to the one or more memory modules 100.

In Example 39, the subject matter of example 38 or any of the Examples described herein may further include, that the means for processing 24 is configured for obtaining one or more execution completed acknowledgements for the one or more memory write instructions executed by the one or more memory modules 100 from the one or more memory modules 100 in response to the forwarded one or more memory write instructions, wherein the means for processing 24 is configured for forwarding the one or more execution completed acknowledgements to a processor 300 of the computer system 1000, wherein the commit instruction is obtained in response to the forwarded one or more execution completed acknowledgements.

In Example 40, the subject matter of one of the examples 38 to 39 or any of the Examples described herein may further include, that the means for processing 24 is configured for obtaining one or more commit completed acknowledgements from the one or more memory modules 100 in response to the forwarded commit instruction, wherein the means for processing is configured for forwarding the one or more commit completed acknowledgements to a processor 300 of the computer system 1000.

Example 41 relates to a processor device 30 for a processor 300 of a computer system 1000. The processor device 30 includes means for communicating 32 with one or more memory controllers 200 of the computer system 1000. The processor device 30 includes means for processing 34 configured for providing a group memory write instruction to one or more memory controllers 200 of the computer system 1000, wherein the group memory write instruction includes a plurality of memory write instructions to be executed atomically. The means for processing 34 is configured for providing a commit instruction to the one or more memory controllers 200.

In Example 42, the subject matter of example 41 or any of the Examples described herein may further include, that the means for processing 34 is configured for obtaining one or more execution completed acknowledgements from the one or more memory controllers 200 in response to the provided group memory write instruction, wherein the commit instruction is provided after obtaining the one or more execution completed acknowledgements.

In Example 43, the subject matter of one of the examples 41 to 42 or any of the Examples described herein may further include, that the means for processing 34 is configured for obtaining one or more commit completed acknowledgements from the one or more memory controllers 200 in response to the provided commit instruction.

In Example 44, the subject matter of example 43 or any of the Examples described herein may further include, that the means for processing 34 is configured for comparing the one or more obtained commit completed acknowledgements with information related to one or more expected commit completed acknowledgements, wherein the means for processing 34 is configured for providing the commit instruction anew if at least one of the one or more expected commit completed acknowledgements is missing.

In Example 45, the subject matter of example 44 or any of the Examples described herein may further include, that the means for processing 34 is configured for determining a commit completed acknowledgement for the entire group memory write instruction based on the one or more obtained commit completed acknowledgements, wherein the means for processing 34 is configured for providing the commit completed acknowledgement for the entire group memory write instruction to a software application being executed by the processor 300.

In Example 46, the subject matter of one of the examples 41 to 45 or any of the Examples described herein may further include, that the processor device 30 is a coherence tracking agent for memory transactions of the processor 300.

In Example 47, the subject matter of one of the examples 41 to 46 or any of the Examples described herein may further include, that the means for processing 34 is configured for determining a group memory write instruction identifier, wherein the means for processing 34 is configured for obtaining the group memory write instruction from the software application and adding the group memory write instruction identifier to the group memory write instruction provided to the one or more memory controllers 200.

In Example 48, the subject matter of one of the examples 41 to 47 or any of the Examples described herein may further include, that the means for processing 34 is configured for providing an instruction set with instructions for the group memory write instruction to applications being executed by the processor 300, wherein the instruction set includes at least an instruction for beginning the group memory write instruction, and an instruction for terminating the group memory write instruction.

Example 49 relates to a memory module 100 including the memory module controller device 10 according to one of the examples 25 to 37.

Example 50 relates to a memory controller 200 including the memory controller device 20 according to one of the examples 38 to 40.

Example 51 relates to a processor 300 including the processor device 30 according to one of the examples 41 to 48.

Example 52 relates to a computer system 1000 including the processor 300 according to example 51, one or more memory controllers 200 according to example 50 and one or more memory modules 100 according to example 49.

Example 53 relates to a memory module controller apparatus 10 for a memory module 100 of a computer system 1000. The memory module controller apparatus 10 includes interface circuitry 12 configured to communicate with a memory controller 200 of the computer system 1000. The memory module controller apparatus 10 includes processing circuitry 14 configured to Obtain one or more memory write instructions of a group memory write instruction, wherein the group memory write instruction includes a plurality of memory write instructions to be executed atomically, wherein the one or more memory write instructions relate to one or more memory addresses associated with memory of the memory module 100. The processing circuitry 14 is configured to execute the one or more memory write instructions using previously unallocated memory of the memory module 100. The processing circuitry 14 is configured to obtain a commit instruction for the group memory write instruction. The processing circuitry 14 is configured to update the one or more memory addresses based on the previously unallocated memory used for executing the one or more memory write instructions after obtaining the commit instruction for the group memory write instruction.

In Example 54, the subject matter of example 53 or any of the Examples described herein may further include, that the plurality of memory write instructions is associated with a group memory write instruction identifier, wherein the commit instruction is valid for the group memory write instruction identifier associated with the plurality of memory write instructions.

In Example 55, the subject matter of one of the examples 53 to 54 or any of the Examples described herein may further include, that the processing circuitry 14 is configured to provide an execution completed acknowledgement for the one or more memory write instructions executed by the memory module 100 to a memory controller 200 associated with the memory module 100 after executing the one or more memory write instructions, wherein the commit instruction is obtained in response to the execution acknowledgement message.

In Example 56, the subject matter of one of the examples 53 to 55 or any of the Examples described herein may further include, that the processing circuitry 14 is configured to provide a commit completed acknowledgement to a memory controller 200 associated with the memory module 100 after updating the one or more memory addresses.

In Example 57, the subject matter of example 56 or any of the Examples described herein may further include, that a power cycle is tolerated between obtaining the commit instruction and providing the commit completed acknowledgement.

In Example 58, the subject matter of one of the examples 53 to 57 or any of the Examples described herein may further include, that the unallocated memory is memory used for wear levelling of the memory module 100.

In Example 59, the subject matter of one of the examples 53 to 58 or any of the Examples described herein may further include, that the processing circuitry 14 is configured to control an address mapping data structure of the memory module 100, wherein the address mapping data structure includes information related to an mapping between a plurality of external memory addresses and a plurality of internal memory addresses of the memory module 100, wherein the update of the one or more memory addresses changes the mapping between one or more external memory addresses of the plurality of external memory addresses and one or more internal memory addresses of the plurality of internal memory addresses.

In Example 60, the subject matter of example 59 or any of the Examples described herein may further include, that the unallocated memory is memory with an internal address without a mapping to an external memory address.

In Example 61, the subject matter of one of the examples 59 to 60 or any of the Examples described herein may further include, that for each external address the address mapping data structure includes a field for the external address, a field for an internal address currently mapped to the external address, and a field for a group memory write instruction identifier associated with the external address, wherein the field for the group memory write instruction identifier is populated, if the one or more memory write instructions relate to the external address.

In Example 62, the subject matter of one of the examples 59 to 61 or any of the Examples described herein may further include, that the processing circuitry 14 is configured to control a data structure for incomplete atomic memory instructions, wherein the data structure for incomplete atomic memory instructions includes a mapping between first and second internal addresses, wherein the first internal address is an internal address mapped to an external memory address in the address mapping data structure before the update of the one or more memory addresses, and wherein the second internal address is an internal address mapped to the same external address in the address mapping data structure after the update of the one or more memory addresses.

In Example 63, the subject matter of example 62 or any of the Examples described herein may further include, that the processing circuitry 14 is configured to add one or more entries to the data structure for incomplete atomic memory instructions for the one or more memory write transactions, and wherein the processing circuitry 14 is configured to remove the one or more entries after Update the one or more memory addresses.

In Example 64, the subject matter of example 63 or any of the Examples described herein may further include, that the data structure for incomplete atomic memory instructions includes a group memory write instruction identifier for each mapping between a first and a second internal address, wherein the address mapping data structure includes a group memory write instruction identifier associated with the external address for each external address of the address mapping data structure associated with the one or more memory write instructions, wherein the commit instruction includes a group memory write instruction identifier, wherein the processing circuitry 14 is configured to identify one or more updates required within the address mapping data structure and to identify one or more mappings within the data structure for incomplete atomic memory instructions associated with the one or more updates based on the group memory write instruction identifier obtained with the commit instruction.

In Example 65, the subject matter of one of the examples 53 to 64 or any of the Examples described herein may further include, that the memory module 100 is a persistent memory module 100.

Example 66 relates to a memory controller apparatus 20 for a memory controller 200 of a computer system 1000. The memory controller apparatus 20 includes interface circuitry 22 configured to communicate with one or more memory modules 100 and with a processor 300 of the computer system 1000. The memory controller apparatus 20 includes processing circuitry 24 configured to obtain at least a portion of a group memory write instruction, wherein the group memory write instruction includes a plurality of memory write instructions to be executed atomically, wherein the portion of the group memory write instruction includes one or more memory write instructions of the plurality of memory write instructions, wherein the one or more memory write instructions relate to one or more memory addresses of memory associated with the memory controller 200. The processing circuitry 24 is configured to forward the one or more memory write instructions to one or more memory modules 100 associated with the memory controller 200. The processing circuitry 24 is configured to obtain a commit instruction for the group memory write instruction, and Forward the commit instruction to the one or more memory modules 100.

In Example 67, the subject matter of example 66 or any of the Examples described herein may further include, that the processing circuitry 24 is configured to obtain one or more execution completed acknowledgements for the one or more memory write instructions executed by the one or more memory modules 100 from the one or more memory modules 100 in response to the forwarded one or more memory write instructions, wherein the processing circuitry 24 is configured to forward the one or more execution completed acknowledgements to a processor 300 of the computer system 1000, wherein the commit instruction is obtained in response to the forwarded one or more execution completed acknowledgements.

In Example 68, the subject matter of one of the examples 66 to 67 or any of the Examples described herein may further include, that the processing circuitry 24 is configured to obtain one or more commit completed acknowledgements from the one or more memory modules 100 in response to the forwarded commit instruction, wherein the processing circuitry 24 is configured to forward the one or more commit completed acknowledgements to a processor 300 of the computer system 1000.

Example 69 relates to a processor apparatus 30 for a processor 300 of a computer system 1000. The processor apparatus 30 includes interface circuitry 32 configured to communicate with one or more memory controllers 200 of the computer system 1000. The processor apparatus 30 includes processing circuitry 34 configured to Provide a group memory write instruction to one or more memory controllers 200 of the computer system 1000, wherein the group memory write instruction includes a plurality of memory write instructions to be executed atomically. The processing circuitry 34 is configured to provide a commit instruction to the one or more memory controllers 200.

In Example 70, the subject matter of example 69 or any of the Examples described herein may further include, that the processing circuitry 34 is configured to obtain one or more execution completed acknowledgements from the one or more memory controllers 200 in response to the provided group memory write instruction, wherein the commit instruction is provided after obtaining the one or more execution completed acknowledgements.

In Example 71, the subject matter of one of the examples 69 to 70 or any of the Examples described herein may further include, that the processing circuitry 34 is configured to obtain one or more commit completed acknowledgements from the one or more memory controllers 200 in response to the provided commit instruction.

In Example 72, the subject matter of example 71 or any of the Examples described herein may further include, that the processing circuitry 34 is configured to compare the one or more obtained commit completed acknowledgements with information related to one or more expected commit completed acknowledgements, wherein the processing circuitry 34 is configured to provide the commit instruction anew if at least one of the one or more expected commit completed acknowledgements is missing.

In Example 73, the subject matter of example 72 or any of the Examples described herein may further include, that the processing circuitry 34 is configured to determine a commit completed acknowledgement for the entire group memory write instruction based on the one or more obtained commit completed acknowledgements, wherein the processing circuitry 34 is configured to provide the commit completed acknowledgement for the entire group memory write instruction to a software application being executed by the processor 300.

In Example 74, the subject matter of one of the examples 69 to 73 or any of the Examples described herein may further include, that the processor apparatus 30 is a coherence tracking agent for memory transactions of the processor 300.

In Example 75, the subject matter of one of the examples 69 to 74 or any of the Examples described herein may further include, that the processing circuitry 34 is configured to determine group memory write instruction identifier, wherein the processing circuitry 34 is configured to obtain the group memory write instruction from the software application and to add the group memory write instruction identifier to the group memory write instruction provided to the one or more memory controllers 200.

In Example 76, the subject matter of one of the examples 69 to 75 or any of the Examples described herein may further include, that the processing circuitry 34 is configured to provide an instruction set with instructions for the group memory write instruction to applications being executed by the processor 300, wherein the instruction set includes at least an instruction for beginning the group memory write instruction, and an instruction for terminating the group memory write instruction.

Example 77 relates to a memory module 100 including the memory module controller apparatus 10 according to one of the examples 53 to 65.

Example 78 relates to a memory controller 200 including the memory controller apparatus 20 according to one of the examples 66 to 68.

Example 79 relates to a processor 300 including the processor apparatus 30 according to one of the examples 69 to 76.

Example 80 relates to a computer system 1000 including the processor 300 according to example 79, one or more memory controllers 200 according to example 78 and one or more memory modules 100 according to example 77.

Example 81 relates to a machine readable storage medium including program code, when executed, to cause a machine to perform the method of one of the examples 1 to 24 or according to any other Example.

Example 82 relates to a computer program having a program code for performing the method of at least one of the examples 1 to 24 or according to any other Example, when the computer program is executed on a computer, a processor, or a programmable hardware component.

Example 83 relates to a machine readable storage including machine readable instructions, when executed, to implement a method or realize an apparatus as claimed in any pending claim or example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A memory module controller apparatus for a memory module of a computer system, the memory module controller apparatus comprising:
   interface circuitry configured to communicate with a memory controller of the computer system, and
   processing circuitry configured to:
     obtain one or more memory write instructions of a group memory write instruction,
       wherein the group memory write instruction comprises a plurality of memory write instructions to be executed atomically,
       wherein the one or more memory write instructions relate to one or more memory addresses associated with memory of the memory module,
     execute the one or more memory write instructions using previously unallocated memory of the memory module,
     obtain a commit instruction for the group memory write instruction,
     update the one or more memory addresses based on the previously unallocated memory used for executing the one or more memory write instructions after obtaining the commit instruction for the group memory write instruction, and control an address mapping data structure of the memory module,
       wherein the address mapping data structure comprises information related to an mapping between a plurality of external memory addresses and a plurality of internal memory addresses of the memory module,
       wherein for each external address the address mapping data structure comprises a field for the external address, a field for an internal address currently mapped to the external address, and a field for a group memory write instruction identifier associated with the external address,
       wherein the field for the group memory write instruction identifier is populated if the one or more memory write instructions relate to the external address.

2. The memory module controller apparatus according to claim 1, wherein the plurality of memory write instructions is associated with a group memory write instruction identifier, wherein the commit instruction is valid for the group memory write instruction identifier associated with the plurality of memory write instructions.

3. The memory module controller apparatus according to claim 1, wherein the processing circuitry is configured to provide an execution completed acknowledgement for the one or more memory write instructions executed by the memory module to a memory controller associated with the memory module after executing the one or more memory write instructions, wherein the commit instruction is obtained in response to the execution acknowledgement message.

4. The memory module controller apparatus according to claim 1, wherein the processing circuitry is configured to provide a commit completed acknowledgement to a memory controller associated with the memory module after updating the one or more memory addresses.

5. The memory module controller apparatus according to claim 1, wherein the unallocated memory is memory used for wear leveling of the memory module.

6. The memory module controller apparatus according to claim 1, wherein the update of the one or more memory addresses changes the mapping between one or more external memory addresses of the plurality of external memory addresses and one or more internal memory addresses of the plurality of internal memory addresses.

7. The memory module controller apparatus according to claim 1 wherein the processing circuitry is configured to control a data structure for incomplete atomic memory instructions, wherein the data structure for incomplete atomic memory instructions comprises a mapping between first and second internal addresses, wherein the first internal address is an internal address mapped to an external memory address in the address mapping data structure before the update of the one or more memory addresses, and wherein the second internal address is an internal address mapped to the same external address in the address mapping data structure after the update of the one or more memory addresses.

8. The memory module controller apparatus according to claim 1, wherein the processing circuitry is configured to add one or more entries to the data structure for incomplete atomic memory instructions for the one or more memory write transactions, and wherein the processing circuitry is configured to remove the one or more entries after updating the one or more memory addresses.

9. The memory module controller apparatus according to claim 1, wherein the memory module is a persistent memory module.

10. A memory controller apparatus for a memory controller of a computer system, the memory controller apparatus comprising:
    interface circuitry configured to communicate with one or more memory modules and with a processor of the computer system, and
    processing circuitry configured to:
        obtain at least a portion of a group memory write instruction,
            wherein the group memory write instruction comprises a plurality of memory write instructions to be executed atomically,
            wherein the portion of the group memory write instruction comprises one or more memory write instructions of the plurality of memory write instructions,
            wherein the one or more memory write instructions relate to one or more memory addresses of memory associated with the memory controller,
        forward the one or more memory write instructions to one or more memory modules associated with the memory controller,
        obtain a commit instruction for the group memory write instruction, and
        forward the commit instruction to the one or more memory modules,.
        obtain one or more commit completed acknowledgements from the one or more memory modules in response to the forwarded commit instruction, and
        compare the one or more obtained commit completed acknowledgements with information related to one or more expected commit completed acknowledgements.

11. The memory controller apparatus according to claim 10, wherein the processing circuitry is configured to obtain one or more execution completed acknowledgements for the one or more memory write instructions executed by the one or more memory modules from the one or more memory modules in response to the forwarded one or more memory write instructions, wherein the processing circuitry is configured to forward the one or more execution completed acknowledgements to a processor of the computer system, wherein the commit instruction is obtained in response to the forwarded one or more execution completed acknowledgements.

12. The memory controller apparatus according to claim 10, wherein the processing circuitry is configured to forward the one or more commit completed acknowledgements to a processor of the computer system.

13. The memory controller apparatus according to claim 10, wherein the processing circuitry is configured to forward the commit instruction anew if at least one of the one or more expected commit completed acknowledgements is missing.

14. A processor apparatus for a processor of a computer system, the processor apparatus comprising:
    interface circuitry configured to communicate with one or more memory controllers of the computer system, and
    processing circuitry configured to:
        provide a group memory write instruction to one or more memory controllers of the computer system,
            wherein the group memory write instruction comprises a plurality of memory write instructions to be executed atomically,
        provide a commit instruction to the one or more memory controllers,
        obtain one or more commit completed acknowledgements from the one or more memory controllers in response to the provided commit instruction, and
        compare the one or more obtained commit completed acknowledgements with information related to one or more expected commit completed acknowledgements.

15. The processor apparatus according to claim 14, wherein the processing circuitry is configured to obtain one or more execution completed acknowledgements from the one or more memory controllers in response to the provided group memory write instruction, wherein the commit instruction is provided after obtaining the one or more execution completed acknowledgements.

16. The processor apparatus according to claim 14, wherein the processing circuitry is configured to provide the commit instruction anew if at least one of the one or more expected commit completed acknowledgements is missing.

17. The processor apparatus according to claim 14, wherein the processing circuitry is configured to determine a commit completed acknowledgement for the entire group memory write instruction based on the one or more obtained commit completed acknowledgements, wherein the processing circuitry is configured to provide the commit completed acknowledgement for the entire group memory write instruction to a software application being executed by the processor.

18. The processor apparatus according to claim 14, wherein the processing circuitry is configured to determine a group memory write instruction identifier, wherein the processing circuitry is configured to obtain the group memory write instruction from the software application and to add the group memory write instruction identifier to the group memory write instruction provided to the one or more memory controllers.

19. The processor apparatus according to claim 14, wherein the processing circuitry is configured to provide an instruction set with instructions for the group memory write instruction to applications being executed by the processor, wherein the instruction set comprises at least an instruction for beginning the group memory write instruction, and an instruction for terminating the group memory write instruction.

* * * * *